United States Patent [19]
Ohtomo et al.

[11] Patent Number: 5,894,123
[45] Date of Patent: Apr. 13, 1999

[54] LASER ROTARY IRRADIATING SYSTEM FOR IRRADIATING A LASER BEAM

[75] Inventors: Fumio Ohtomo; Kazuki Osaragi; Kenichiro Yoshino, all of Tokyo, Japan

[73] Assignee: Kabushiki Kaisha TOPCON, Tokyo-to, Japan

[21] Appl. No.: 08/849,234

[22] PCT Filed: Oct. 29, 1996

[86] PCT No.: PCT/JP96/03152
§ 371 Date: May 2, 1997
§ 102(e) Date: May 2, 1997

[87] PCT Pub. No.: WO97/16703
PCT Pub. Date: May 9, 1997

[30] Foreign Application Priority Data

Oct. 30, 1995 [JP] Japan ................................. 7/304966
Jan. 26, 1996 [JP] Japan ................................. 8/32737

[51] Int. Cl.$^6$ ................................................... H01J 3/14
[52] U.S. Cl. ...................... 250/236; 250/559.3; 356/401
[58] Field of Search ................................. 250/234, 235, 250/237 R, 236, 566, 556, 559.3; 235/462, 472; 359/210–215; 356/375, 401

[56] References Cited

U.S. PATENT DOCUMENTS 5,373,154  12/1994  Chen ......................................... 250/235

FOREIGN PATENT DOCUMENTS

| 61-38416 | 2/1986 | Japan . |
| 6-201383 | 7/1994 | Japan . |
| 7-12569 | 1/1995 | Japan . |
| 7-134026 | 5/1995 | Japan . |
| 8-14891 | 1/1996 | Japan . |

*Primary Examiner*—Que T. Le
*Attorney, Agent, or Firm*—Nields, Lemack & Dingman

[57] ABSTRACT

Laser rotary irradiating system comprising a rotary irradiating system main unit and object reflectors including at least a first object reflector and a second object reflector. The rotary irradiating system main unit comprises a rotating and irradiating an irradiation light beam toward the object reflectors, a detector for detecting a reflection light beam reflected from the object reflectors and entering the rotary irradiating system main unit via the rotating unit, and a reflection light detection circuit for identifying the object reflectors from an output of the detector. The position and range of the scanning of the laser beam are determined based on the results of the detection, whereby each of the reflection surfaces of the object reflectors is divided into at least two portions, an irradiation position is confirmed by the first object reflector while the scanning position is confirmed by the second object reflector, and an irradiation light beam is irradiated for reciprocal scanning.

15 Claims, 21 Drawing Sheets

LASER BEAM SCANNING DIRECTION

OUTPUT SIGNAL OF DIFFERENTIAL AMPLIFIER 141

REFERENCE POSITION

LASER BEAM SCANNING DIRECTION

OUTPUT SIGNAL OF DIFFERENCE AMPLIFIER 141

OUTPUT SIGNAL OF DIFFERENCE AMPLIFIER 141

OUTPUT SIGNAL OF
1ST PHOTOELECTRIC
CONVERTER 134

REFERENCE POSITION

OUTPUT SIGNAL OF
1ST PHOTOELECTRIC
CONVERTER 134 m  n      o

OUTPUT SIGNAL OF
1ST PHOTOELECTRIC
CONVERTER 134

5,894,123

LASER ROTARY IRRADIATING SYSTEM FOR IRRADIATING A LASER BEAM

FIELD OF THE INVENTION

The present invention relates to a laser rotary irradiating system for irradiating a laser beam in vertical or horizontal directions to scan and for forming a reference line or a reference plane.

BACKGROUND ART

In the fields of civil engineering and architectural engineering, a laser rotary irradiating system for irradiating a laser beam for rotary scanning has been used to form a reference plane or a reference line. The positioning of a partition to be installed in a building or of lighting fixtures such as fluorescent lighting to be mounted on a ceiling is performed according to a setting-out line marked on a floor, and the position given by the setting-out line is determined by projecting it on the surface of the ceiling or the wall, etc. by a laser rotary irradiating system. The irradiating position of the laser beam is confirmed by an object reflector.

To align a reference plane formed by the laser rotary irradiating system with the setting-out line marked on the floor, a point vertically under the rotating axis of the laser beam of the rotary irradiating system main unit is aligned with a first reference point on the setting-out line, and the reference plane formed by the laser rotary irradiating system is aligned with at least one of a second reference point on the setting-out line far from the main unit.

In the conventional type laser rotary irradiating system as described above, after the laser beam reference plane formed by the laser rotary irradiating system is aligned with the setting-out line, it is not possible to detect by the laser rotary irradiating system itself whether or not the laser beam reference plane is aligned with the setting-out line during positioning operation. For this reason, if deviation occurs between the laser beam reference plane and the setting-out line, an error occurs in the positioning operation.

To solve the above problem, it is an object of the present invention to provide a laser rotary irradiating system, by which it is possible to detect by the laser rotary irradiating system itself the condition of alignment of the laser beam reference plane with the setting-out line during operation after the reference plane has been aligned with the setting-out line, and to improve reliability of the laser beam reference plane. Also, it is another object of the invention to provide a system, by which it is possible to reliably detect an object reflector without being influenced by external disturbance light in the detection of the object reflector.

DISCLOSURE OF THE INVENTION

The system according to the present invention comprises a rotary irradiating system main unit and object reflectors including at least a first object reflector and a second object reflector, said rotary irradiating system main unit comprises a rotating unit for rotating and irradiating an irradiation light beam toward the object reflectors, detecting means for detecting a reflection light beam reflected from the object reflectors and entering to the rotary irradiating system main unit via said rotating unit, and a reflection light detection circuit for identifying the object reflectors from an output of said detecting means, wherein position and range of scanning by the laser beam are determined based on the results of said detection, and each of the reflection surfaces of said object reflectors is divided into at least two portions. The present invention also provides a laser rotary irradiating system, which comprises a rotary irradiating system main unit and object reflectors including at least a first object reflector and a second object reflector, said rotary irradiating system main unit comprises a rotating unit for rotating and irradiating a polarized irradiation light beam toward the object reflectors, first detecting means for detecting a polarized reflection light beam from the object reflectors and entering the rotary irradiating system main unit via said rotating unit, second detecting means for detecting a polarized light beam different from said polarized reflection light beam from the object reflectors, and a reflection light detection circuit for identifying the object reflectors by comparing of an output of the first detecting means with an output of the second detecting means, wherein a position and a range of scanning by the laser beam are determined based on the results of said detection, each of reflection surfaces of said object reflectors is divided into at least two sectors, at least one thereof is a polarization maintaining reflection sector to reflect as a polarized reflection light beam, which maintains direction of polarization as that of the polarized irradiation light beam, and at least other one thereof is a polarization converting reflection sector to reflect as a polarized reflection light beam, which converts direction of polarization from that of the polarized irradiation light beam. Further, the present invention provides a laser rotary irradiating system, wherein a dividing mode of reflection surfaces is different between said first object reflector and said second object reflector. The invention also provides a laser rotary irradiating system, wherein the irradiation light beam irradiated from said rotating unit is a circularly polarized light. The invention further provides a laser rotary irradiating system, wherein each of said first object reflector and said second object reflector has two or more reflection sectors divided, the reflection sectors of said first object reflector are arranged at symmetrical positions, and shape of the reflection sectors of said second object reflector are gradually changed. The invention also provides a laser rotary irradiating system, wherein all of the reflection surfaces of the object reflector are retroreflection surfaces. Further, the invention provides a laser rotary irradiating system, wherein all of the reflection surfaces of the object reflector are λ/4 birefringence reflection surfaces. The invention also provides a laser rotary irradiating system, wherein said first object reflector is divided in such manner that there is no change in width of the polarization maintaining reflection sector and the polarization converting reflection sector, and the second object reflector is divided in such manner that one of width of the polarization maintaining reflection sector or the polarization converting reflection sector is gradually decreased, and the other of width is gradually increased. Further, the invention provides a laser rotary irradiating system, wherein said first object reflector is divided in such manner that there is no change in width of the polarization maintaining reflection sector and the polarization converting reflection sector, and said second object reflector is divided in such manner that shapes of the polarization maintaining reflection sector and the polarization converting reflection sector are symmetrical. Further, the invention provides a laser rotary irradiating system, wherein said first object reflector is divided in such manner that there is no change in width of the polarization maintaining reflection sector and the polarization converting reflection sector, and the second object reflector is divided in such manner that there is change in width of at least one of the reflection sector or the polarization converting reflection sector, and said second object reflector is designed in such shape that there is an extreme value in width change. The invention also provides a laser rotary irradiating system, wherein said first object reflector is provided with a plurality of combined reflection sectors, comprising a polarization maintaining reflection sector and a polarization converting reflection sector, and the combined reflection sectors are separated from each other. Further, the invention provides a laser rotary irradiating system, wherein the reflection light detection circuit detects widths of the reflection sector and the polarization converting reflection sector depending upon light receiving time to receive the polarized reflection light beam. The invention further provides a laser rotary irradiating system, wherein the reflection light detection circuit calculates time interval of two signals obtained by scanning the object reflector, and a distance between the rotary irradiating system main unit and the object reflector is calculated based on said time interval and on dimensions already known of the object reflector corresponding to said two signals. The invention also provides a laser rotary irradiating system, wherein an encoder for detecting an angle of rotation of the rotating unit is provided, and the reflection light detection circuit detects widths of the reflection sector and the polarization converting reflection sector from the angle, at which each polarized reflection light beam is obtained, based on signals from said encoder and on signals from said first detecting means and said second detecting means. Further, the invention provides a laser rotary irradiating system, wherein there is provided an encoder for detecting an angle of rotation of the rotating unit, the reflection light detection circuit obtains an angle of rotation between two signals by said encoder based on the two signals obtained by scanning the object reflector, and a distance between the rotary irradiating system main unit and the object reflector is calculated based on said angle of rotation and dimensions already known of the object reflector corresponding to said two signals. The invention also provides a laser rotary irradiating system, wherein said first object reflector is divided in such manner that there is no change in widths of the reflection sector and the non-reflection sector, and the second object reflector is divided in such manner that the shapes of the reflection sector and the non-reflection sector are symmetrical. Further, the invention provides a laser rotary irradiating system, wherein said first object reflector is divided in such manner that there is no change in widths of the reflection sector and the non-reflection sector, and the second object reflector is divided in such manner that there is change in width of at least one of the reflection sector and the non-reflection sector and at least one of said sectors has a shape that there is an extreme value in width change. The invention further provides a laser rotary irradiating system, wherein the reflection light detection circuit identifies the first object reflector and the second object reflector, reciprocal scanning is performed on and around the first object reflector and scanning position of the laser beam is detected from condition of change of the reflection laser beam from the second object reflector. The invention also provides a laser rotary irradiating system, wherein a laser beam irradiating optical system of said rotary irradiating system main unit has focusing means. Further, the invention provides a laser rotary irradiating system, wherein the laser beam irradiating optical system of said rotary irradiating system main unit has focusing means, and the irradiation light beam is focused on the object reflector based on said calculated distance to the object reflector.

The position of the first object reflector is confirmed while checking the scanning position of the polarized irradiation light beam on the second object reflector, and reciprocal scanning is performed by the polarized irradiation light beam. Thus, setting-out operation can be carried out at high accuracy, and detection can be performed even when positional deviation occurs after the laser rotary irradiating system has been installed, thus facilitating easy correction and providing high accuracy in setting-out operation. Also, by changing number and combination of the polarization converting reflection sector and the reflection sector, it is possible to identify the first object reflector and the second object reflector. For the detection of positional deviation, scanning position signal is detected from the second object reflector and is stored, and after reciprocal scanning has been performed by the polarized irradiation light beam on and around the first object reflector, the scanning position signal is detected from the second object reflector and it is compared with the stored signal, and the scanning position with respect to the second object reflector can be detected. Or, for the detection of positional deviation, the scanning position signal is detected from the second object reflector each time a predetermined time has elapsed and is stored, and this is compared with the signal previously detected, and the scanning position with respect to the second object reflector can be detected. Further, a display unit is provided, and by displaying the scanning position on said display unit, positioning and positional deviation can be monitored in easier manner. Or, by monitoring the scanning position of the polarized reflection light beam with respect to the second object reflector based on the scanning signal, it is possible to guarantee accuracy of irradiating position of the polarized irradiation light beam of the laser rotary irradiating system. Further, visualizing property can be improved by focusing the laser beam on irradiation surface of the object reflector.

BEST MODE FOR CARRYING OUT THE INVENTION

Figure 1:
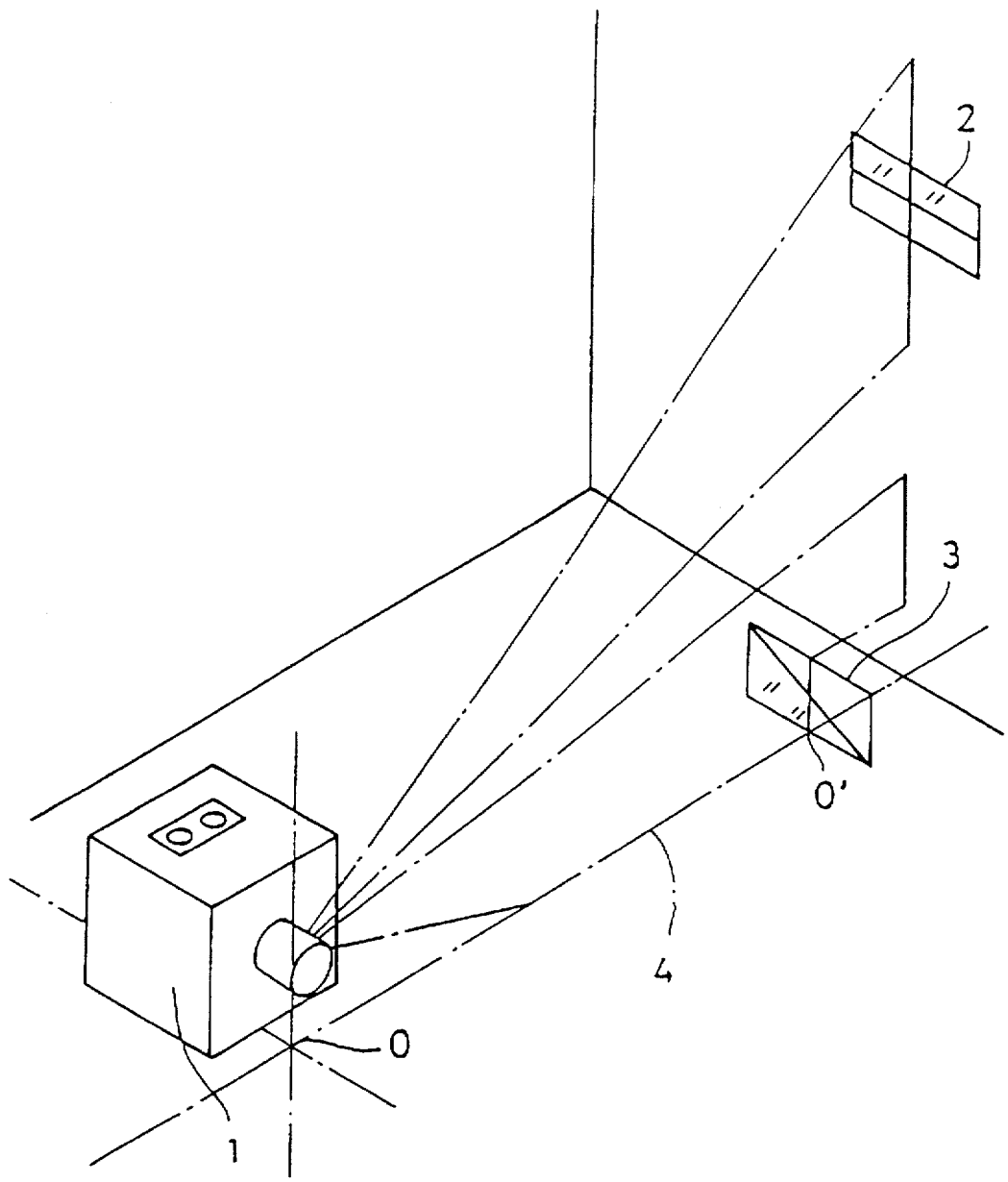
FIG. 1 is a schematical drawing of an embodiment of the system of the present invention.

In the following, description will be given on embodiments of the present invention referring to the drawings.

FIG. 1 shows a laser rotary irradiating system according to an embodiment of the present invention. The laser rotary irradiating system comprises a rotary irradiating system main unit 1, and a first object reflector 2 and a second object reflector 3 arranged separately from said rotary irradiating system main unit 1. In FIG. 1, reference numeral 4 represents a setting-out line, and reference symbol O represents a first reference point on the setting-out line 4.

First, description will be given on mechanical arrangement of the embodiment referring to FIG. 2 to FIG. 5. In an optical system in this mechanical arrangement, a light emitter 115 and a reflection light detector 117 (to be described later) are not shown.

At the center of a casing 5, a recessed portion 6 in shape of truncated cone is formed, and a support seat 7 is provided at the center of the recessed portion 6. The support seat 7 is designed in circular shape and has a through-hole 8, and a projection 9 is smoothly protruded on a tertiary curved surface at each of three positions equally divided on inner periphery of the through-hole 8.

A laser projector 10 for emitting laser beam is placed into the through-hole 8, and a head 11 of the laser projector 10 is engaged with and supported by the support seat 7. The head 11 has its lower portion designed in spherical surface, and a spherical unit 11a is abutted on each of three projections 9. The laser projector 10 is supported in such manner that it can be freely tilted in any direction with respect to the vertical line. The head 11 is provided with a motor seat 14, on which a scanning motor 15 is mounted, and a driving gear 16 is engaged on an output shaft of the scanning motor 15. The driving gear 16 is engaged with a scanning gear 17 (described later).

Figure 6:
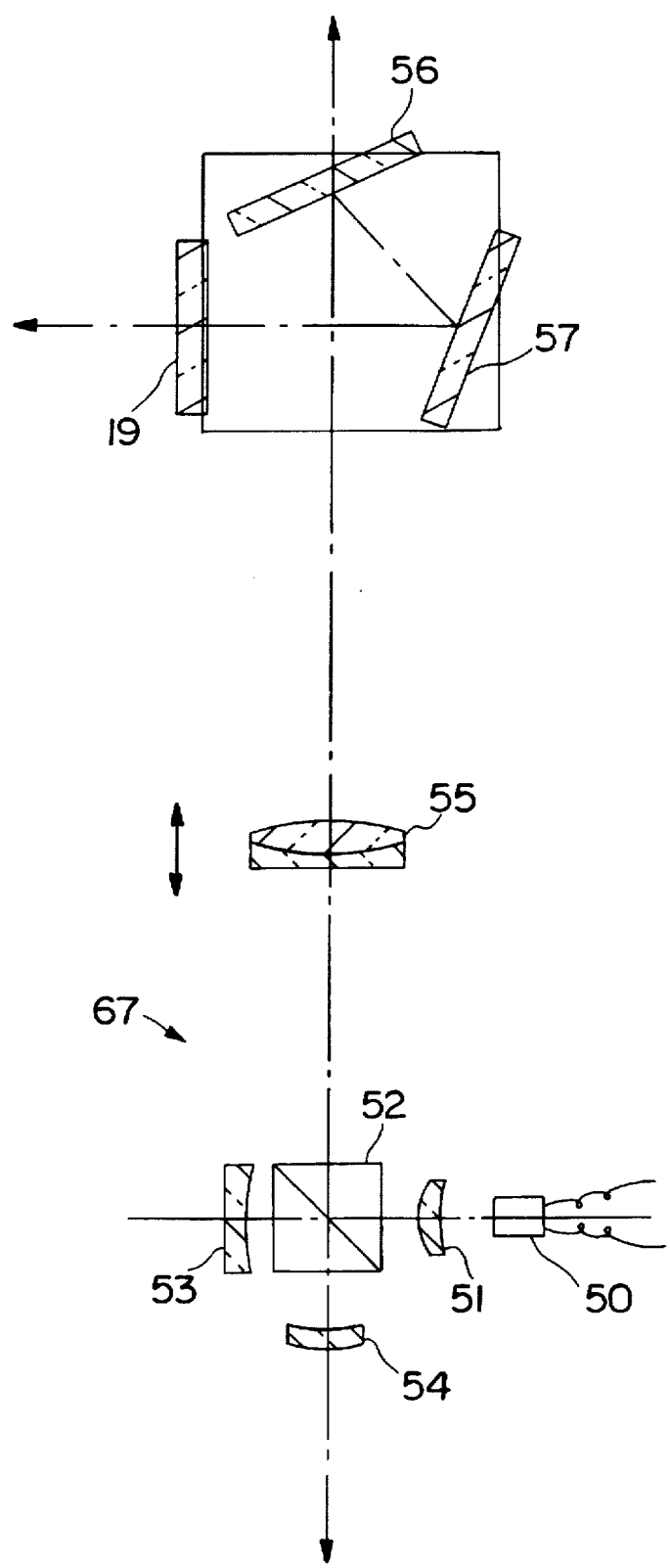
FIG. 6 is a drawing to show basic arrangement of a laser beam projecting optical system of the laser rotary irradiating system main unit.

The laser projector 10 is designed in a hollow structure with a hollow portion running in a vertical direction, and a laser beam projecting optical system 67 shown in FIG. 6 is accommodated in the hollow portion.

In the hollow portion, an internal 59 is slidably engaged, and an objective lens 55 is mounted in the internal 59 in such manner that its optical axis is aligned with the axis of the laser projector 10. A half-prism 52 is arranged under the objective lens 55 and is aligned with the optical axis of the objective lens 55, and a laser diode 50 for emitting visible laser beam is arranged at a position on one side of the half-prism 52. A condenser lens 51 is arranged between the laser diode 50 and the half-prism 52. At a position on the other side of the half-prism 52 and opposite to the condenser lens 51, a concave mirror 53 is placed. A lower condenser lens 54 is arranged under the half-prism 52 and is aligned with the optical axis of the objective lens 55.

The laser beam emitted from the laser diode 50 is split by the half-prism 52 into an upper vertical laser beam advancing in an upward direction and a transmitting laser beam. The upper vertical laser beam passes through the objective lens 55 and is irradiated. The transmitting laser beam is reflected by the concave mirror 53 and is further reflected in a downward direction by the half-prism 52, and after passing through the lower condenser lens 54, it is irradiated as a lower vertical laser beam.

An adjusting arm 68 is extended from the internal 59 through the laser projector 10 and is connected to a focusing nut 60, which is screwed on a focusing adjustment screw 61 (to be described later). Bridging between upper and lower intermediate base plates 69 and 70 arranged at lateral positions of the laser projector 10, the focusing adjustment screw 61 is rotatably mounted in parallel to the laser projector 10, and a driven gear 62 is engaged with one end of the focusing adjustment screw 61. A focusing motor 64 is mounted on the intermediate base plate 70, and a focusing gear 63 placed on an output shaft of the focusing motor 64 is engaged with the driven gear 62.

When the focusing gear 63 is driven, the focusing adjustment screw 61 is rotated, and the focusing nut 60 is moved up and down. The movement upward or downward is transmitted to the internal 59 via the adjusting arm 68, and focusing condition of a laser beam from the laser diode 50 is adjusted.

On the head 11 of the laser projector 10, a rotation support member 13 is rotatably mounted via a bearing 12 in such manner that the rotation support member 13 is aligned with the axis of the laser projector 10. The scanning gear 17 is engaged with the rotation support member 13, and the driving gear 16 is engaged with the scanning gear 17 as described above so that the rotation support member 13 can be rotated around the vertical axis by the scanning motor 15.

On the lower surface of the scanning motor 15, an angle detection pattern (not shown) is provided, which has a reflection pattern to reflect light and a non-reflection pattern not reflecting light provided on the same circumference alternately and with equal pitch. On the motor seat 14, a light projector/receiver 72 is mounted at a position opposite to the angle detection pattern. Light is projected from the light projector/receiver 72 to the angle detection pattern, and the reflection light from the angle detection pattern is received. As a result, a rotation angle and a rotating speed of the rotation support member 13 can be detected.

In the rotation support member 13, there are provided a pentagonal half-mirror 56 for splitting the upper vertical laser beam into a transmission light and a reflection light and a pentagonal mirror 57 to reflect the reflection laser beam from the pentagonal half-mirror 56 in a horizontal direction. The laser beam irradiated from the laser projector 10 is irradiated in a horizontal direction through a projection window 19, and the laser beam passing through the pentagonal half-mirror 56 is irradiated upwardly as an upper vertical laser beam. In case it is not necessary to irradiate the laser beam upwardly, the pentagonal half-mirror 56 and the pentagonal mirror 57 may be replaced with one pentagonal prism.

Level sensors 20 and 21 for detecting a horizontal position are provided on the lower portion of the laser projector 10. A holding arm 71 extending in a lateral direction from the laser projector 10 is arranged, and a vertical tilt sensor 65 is mounted on the tip of the holding arm 71. The vertical tilt sensor 65 is arranged in parallel to the optical axis of the laser beam projecting optical system 67 of the laser projector 10.

A tilt detecting member 23 is fixed on the lower end of the laser projector 10, and the tilt detecting member 23 is designed in form of an inverted cup and comprises a reflection mirror flange 22 on its periphery. On the bottom of the casing 5 and at positions opposite to the tilt detecting member 23, optical sensors 24a, 24b, 24c, and 24d comprising a given number (4 in the present embodiment) of light emitting elements and photodetector elements are arranged on the same circumference and around the axis of the laser projector 10 when the casing 5 and the laser projector 10 are at the vertical position.

In case the laser projector 10 is extensively tilted, the light beams coming from the optical sensors 24a, 24b, 24c, and 24d are reflected by the reflection mirror flange 22 and are sensed by the optical sensors 24a, 24b, 24c and 24d, and the extensive tilting of the laser projector 10 is detected.

From the head 11 of the laser projector 10, tilting arms 25 and 26 crossing each other perpendicularly are extended in a horizontal direction. Penetrating the conical surface of the recessed portion 6, these arms are positioned inside the casing 5, and engaging pins 27 and 28 are arranged on the tip of each of the tilting arms 25 and 26. The engaging pins 27 and 28 are designed in cylindrical shape, and the axes of the cylindrical pins cross each other perpendicularly and are positioned in such manner that these axes are included in a plane, which passes through the spherical center of the spherical unit 11a. One of the engaging pins 27 and 28, e.g. the engaging pin 27 is restricted to horizontal movement, and it is movable only in a vertical direction. Although not shown in the figure, there may be provided such means that the engaging pin 27 is slidably engaged in a guide groove extending in a vertical direction or that the engaging pin 27 may be slidably pressed against a wall surface extending in a vertical direction by resilient means such as a spring.

On the inner wall of the casing 5, shelf plates 29 and 30 are provided, and a level adjusting motor 31 is mounted on the shelf plate 29, and a level adjusting motor 32 is mounted on the shelf plate 30. A driving gear 33 is engaged on a rotation shaft of the level adjusting motor 31, and a driving gear 34 is mounted on a rotation shaft of the level adjusting motor 32. A screw shaft 35 crossing the engaging pin 27 perpendicularly and bridging between the ceiling of the casing 5 and the shelf plate 29 is rotatably mounted. A driven gear 36 is mounted on the screw shaft 35 and is engaged with the driving gear 33. A slide nut 37 is screwed on the screw shaft 35, and a pin 38 is mounted on and is protruded from the slide nut 37. The pin 38 and the engaging pin 27 are slidably abutted on each other.

Similarly, a screw shaft 39 crossing the engaging pin 28 perpendicularly and bridging between the ceiling of the casing 5 and the shelf plate 30 is rotatably mounted. A driven gear 40 is mounted on the screw shaft 39, and the driven gear 40 is engaged with the driving gear 34. A slide nut 41 is screwed on the screw shaft 39, and a pin 42 is mounted on the slide nut 41 as it protrudes from it, and the pin 42 and the engaging pin 28 are slidably abutted on each other.

A spring receptacle 43 is provided on the ceiling of the casing 5 and between the screw shaft 35 and the screw shaft 39, and a spring 44 is stretched between the spring receptacle 43 and the laser projector 10. The spring 44 pushes the laser projector 10 clockwise around the support seat 7 as shown in FIG. 2.

In the figure, reference numeral 45 represents a battery box for accommodating a battery to drive the laser rotary irradiating system. The main unit of the laser rotary irradiating system as described above is placed on a tripod (not shown) via bolts 46 for leveling. Reference numeral 47 represents a glass window placed around the rotation support member 13, and 58 represents a ceiling window glass, which allows the upper vertical laser beam to pass.

Figure 2:
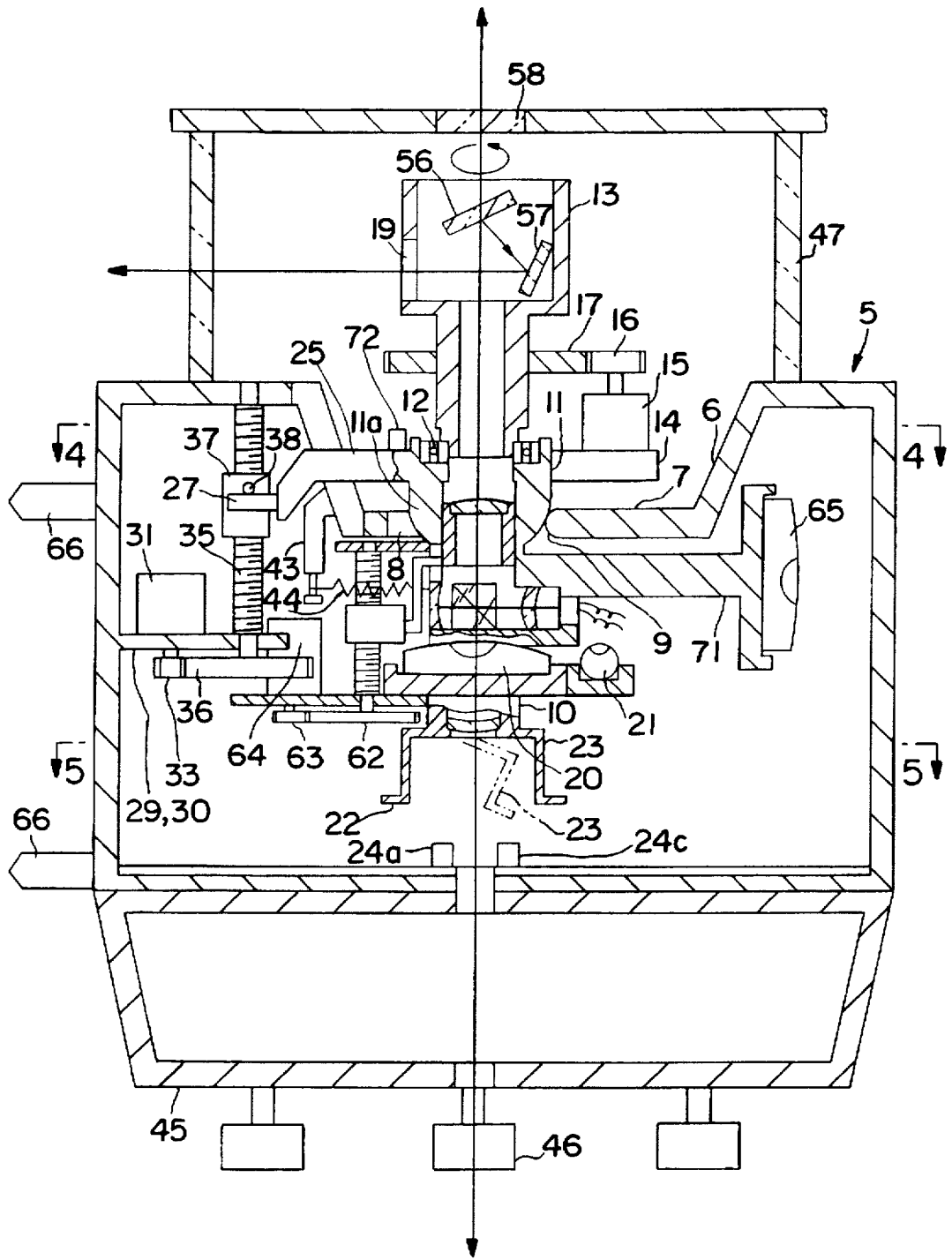
FIG. 2 is a cross-sectional view of a laser rotary irradiating system main unit.

The laser rotary irradiating system of the present embodiment can be used in both vertical position and horizontal position (the position of the system when it is laid down in a leftward direction from the position shown in FIG. 2). At the horizontal position, at least three auxiliary legs 66 arranged on sides of the casing 5 support the laser rotary irradiating system, and at least one of them can be adjusted in height.

Figure 7:
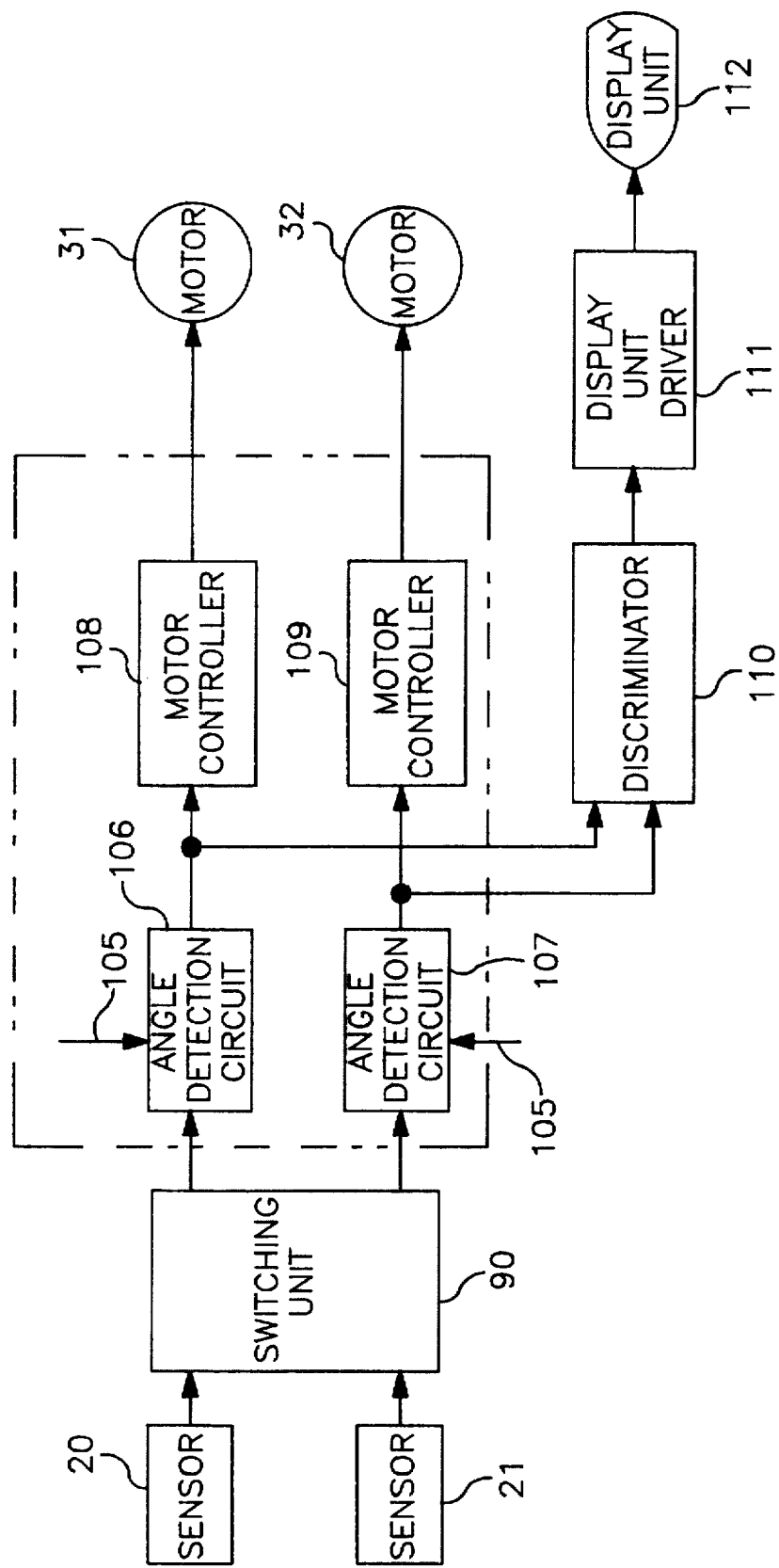
FIG. 7 represents a control block diagram of leveling operation of the present embodiment.

Next, FIG. 7 shows a control unit for adjusting vertical position of the laser rotary irradiating system of the present embodiment.

The results of the detection by the level sensors 20 and 21 are inputted to a leveling control unit 91 via a switching unit 90 (to be described later) respectively. After being inputted to the leveling control unit 91, detection results of the level sensors 20 and 21 are inputted to angle detection circuits 106 and 107. In the angle detection circuits 106 and 107, a reference angle 105 (normally, the reference plane is horizontal, and the reference angle is 0°) is set. In the angle detection circuits 106 and 107, angular deviation is calculated based on the reference angle 105. The angular deviation thus calculated is inputted to a motor controllers 108 and 109 respectively. The motor controllers 108 and 109 drive the level adjusting motors 31 and 32 respectively so that the deviation is turned to 0.

The values of angular deviation of the angle detection circuits 106 and 107 are inputted to a discriminator 110, and the discriminator 110 selects one of the angular deviations of the angle detection circuits 106 or 107, whichever is greater. An output corresponding to the change of the selected angular deviation is outputted to a display unit driver 111, and the display unit driver 111 displays a value corresponding to the value of deviation on a display unit 112.

In the following, description will be given on leveling operation of the laser rotary irradiating system.

When the rotary irradiating system main unit 1 is installed and is not yet adjusted, the axis of the laser projector 10 is generally not aligned with the vertical line, and the level sensors 20 and 21 are not in a horizontal position. If it is supposed that the reference angle 105 is 0°, an angular deviation signal is outputted from the angle detection circuits 106 and 107. When the angular deviation signal is outputted, the motor controllers 108 and 109 drive the level adjusting motors 31 and 32 in a suitable direction so that the angular deviation signal is turned to 0.

The operation of the level adjusting motors 31 and 32 is described now, taking an example on the level adjusting motor 31.

When the level adjusting motor 31 is driven, rotation of the level adjusting motor 31 is transmitted to the screw shaft 35 via the driving gear 33 and the driven gear 36, and the slide nut 37 is moved up or down as the screw shaft 35 is rotated. Upward or downward movement of the slide nut 37 is transmitted to the tilting arm 25 via the pin 38 and the engaging pin 27, and the laser projector 10 is tilted.

As described above, the engaging pin 27 is movable only in a vertical direction since horizontal movement is restricted, and a tilting direction of the laser projector 10 is thus restricted, and it is tilted around the axis of the engaging pin 28 passing through the spherical center of the spherical unit 11a. Next, when the level adjusting motor 32 is driven, the screw shaft 39 is rotated, and the engaging pin 28 is moved up or down via the pin 42.

Horizontal movement of the engaging pin 27 is restricted by a groove (not shown) and vertical movement is restricted by the pin 38 and the spring 44. As a result, only the movement to rotate around the axis of the engaging pin 27, passing through the center of the spherical unit 11, is allowed to the engaging pin 27. When the pin 42 is moved up or down, changing movement in a vertical direction is given to the engaging pin 28 as it slides between the pin 42 and the engaging pin 28 in an axial direction. Then, the laser projector 10 is tilted around the axis of the engaging pin 27. Because the engaging pin 27 has a circular cross-section as described above, the tilting of the axis of the engaging pin 27 undergoes no change even when the engaging pin 27 is rotated. That is, tilting operation of the level adjusting motors 31 and 32 does not exert influence on the other tilting of axes of the engaging pins 27 and 28. Therefore, a tilt adjusting operation of one shaft can be independently performed from the tilt adjusting operation of the other shaft. As a result, the tilt adjusting operation and a control sequence relating to the tilt adjusting operation can be extremely simplified.

The laser projector 10 is pushed clockwise in FIG. 2 by the spring 44, and the laser projector 10 accurately follows the movement of the slide nut 37.

In the tilting operation of the laser projector 10, the laser projector 10 is stably supported and is not shaky because the spherical unit 11a of the laser projector 10 is supported at three points by the projections 9. Because it is the contact between the spherical unit 11a and the smooth curved surfaces of the projections 9, the laser projector 10 can be moved smoothly and freely in any tilting direction, and the position of the laser projector 10 can be easily adjusted.

When the laser projector 10 is tilted and leveling operation proceeds, detection values from the level sensors 20 and 21 are also turned to closer to a horizontal position. Finally, the angular deviations outputted by the angle detection circuits 106 and 107 are turned to 0, and the leveling operation is completed.

The level sensors 20 and 21 have narrow detection range. If a predetermined range is exceeded, it is turned to a saturated state, and the value of tilt angle cannot be detected although a tilting direction can be detected. Accordingly, the optical sensors 24a, 24b, 24c and 24d are provided so that an adjusting mechanism, which comprises the level adjusting motors 31 and 32, the driving gears 33 and 34, the driven gears 36 and 40, the screw shafts 35 and 39, the slide nuts 37 and 41, the titling arms 25 and 26, etc., is not operated beyond the mechanical adjustment range. Specifically, when the limit of the mechanical adjustment is reached, a light irradiated from one of the optical sensors 24a, 24b, 24c and 24d is reflected by the reflection mirror flange 22 and is received by the optical sensors, and it is detected that the limit of the mechanical adjustment range is reached. Then, the level adjusting motors 31 and 32 are stopped or it is displayed on the display unit that the limit of the mechanical range has been reached, or alarm by buzzer is issued.

When the above condition occurs, a rough adjustment is performed to be within the adjustment range using the leveling bolts 46, and the leveling operation is started again.

When the leveling operation is completed, a laser beam is irradiated from the laser projector 10. Further, the scanning motor 15 is driven and the laser projector 10 is rotated around the vertical axis. A laser beam is irradiated in a horizontal direction from the pentagonal mirror 57 and is rotated. Thus, a horizontal reference plane is formed by the laser beam.

The laser beam is irradiated as parallel beams unless specified otherwise. In order to have a more accurate projecting position on a projection surface, e.g. on the wall surface where a first object reflector is placed, the laser beam may be focused on the projection surface. The focusing motor 64 is driven and the focusing adjustment screw 61 is rotated via the focusing gear 63 and the driven gear 62. The internal 59 is slid together with the focusing nut 60 to change position of the objective lens 55, and the laser beam is focused on or near the object reflector. Based on the photodetection signal when the object reflector is scanned and on the output of an encoder 129 (to be described later) at that moment, the angle between the first object reflector 2 and the second object reflector 3 (angle between ends of the reflectors) can be calculated (See FIG. 9). Because dimensions of the first object reflector 2 and the second object reflector 3 are already known, a distance from the rotary irradiating system main unit 1 to the first object reflector 2 or to the second object reflector 3 can be calculated. If an mount of movement of the internal 59 is associated with the focusing distance, the irradiated laser beam can be focused on the object reflectors 2 and 3. By focusing the laser beam on the object reflectors 2 and 3, luminance is increased, and visibility is improved.

At the same time with the formation of the horizontal reference plane by the laser beam, upper and lower vertical laser beams are irradiated, and a point of the ceiling surface on a vertical line to match a predetermined point of the floor surface can be easily obtained.

Figure 8:
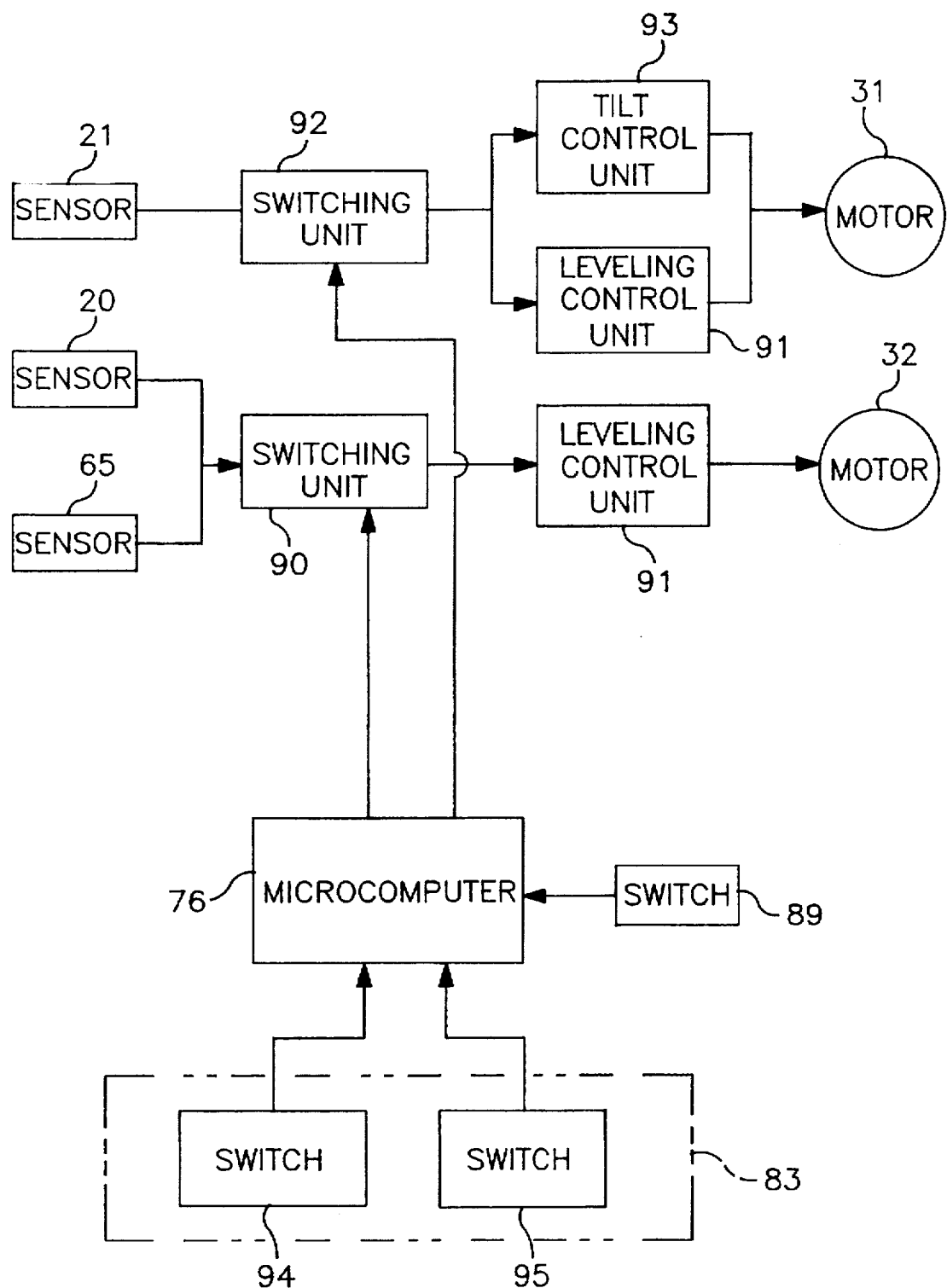
FIG. 8 is a control block diagram of scanning of the present embodiment.

As described above, the laser rotary irradiating system of the present embodiment can be used both at a vertical position and at a horizontal position. In case it is used at a vertical position (the position shown in FIG. 2), it is necessary to neglect signals of the vertical tilt sensor 65. In case it is used at a horizontal position, it is necessary to neglect signals from the level sensors 20 and 21. Further, leveling operation control is not required at a horizontal position. Accordingly, it is so arranged that control functions are switched over between the cases where it is used at a vertical position and at a horizontal position. Description will be given on the switching of the control functions referring to FIG. 8.

By a mercury switch 89 arranged at a suitable position on the laser rotary irradiating system, horizontal and vertical conditions of the laser rotary irradiating system are detected, and the results of detection by the mercury switch 89 are inputted to a microcomputer 76.

As described above, signals from the level sensor 20 and the vertical tilt sensor 65 are inputted to the leveling control unit 91 via the switching unit 90, and the level adjusting motor 32 is controlled by the leveling control unit 91. Signal from the level sensor 21 is inputted to a tilt control unit 93 and the leveling control unit 91 via a switching unit 92, and the level adjusting motor 31 is driven and controlled by the tilt control unit 93 or the leveling control unit 91.

An input 83 is connected to the microcomputer 76. To input to the microcomputer 76, a manual switch 94 for turning on or off the automatic leveling function and a tilt input switch 95 for tilting the laser projector 10 are used. The mode of the input is switched over by an operation unit 84 or a remote controller 87 (not shown).

When the laser rotary irradiating system is at a vertical position, the mercury switch 89 detects a vertical condition of a surveying instrument and the result is inputted to the microcomputer 76. The microcomputer 76 issues switching signals to the switching units 90 and 92, and the signal from the vertical tilt sensor 65 is neglected. The signals from the level sensors 20 and 21 are inputted to the leveling control unit 91 so that leveling operation can be performed.

When the laser rotary irradiating system is placed at horizontal position and is supported by the auxiliary legs 66, the mercury switch 89 detects a horizontal condition of the laser rotary irradiating system, and the result is inputted to the microcomputer 76. The microcomputer 76 issues switching signals to the switching units 90 and 92, the signal from the vertical tilt sensor 65 for vertical position is inputted to the leveling control unit 91, and a leveling operation can be performed. It should be so arranged that signals from the level sensors 20 and 21 are not inputted to the leveling control unit 91.

Under the above condition, the laser beam is standard laser beam, irradiating upper and lower vertical laser beams in horizontal directions. By rotating the scanning motor 15, it is possible to form a reference plane on a vertical plane. Further, horizontality of the upper and lower vertical laser beams can be adjusted by driving the level adjusting motor 31 using the vertical tilt sensor 65.

In case an input to tilt the laser projector 10 is given by the tilt input switch 95 regardless of whether the laser rotary irradiating system is at horizontal position or at vertical position, a switching signal is issued to the switching unit 92 via the microcomputer 76. Neglecting the level sensor 21, the level adjusting motor 31 is operated via the tilt control unit 93, and the laser projector 10 is tilted.

The condition shown in FIG. 1 is the condition where the laser rotary irradiating system is installed at horizontal position, and the reference plane formed by the laser beam is a vertical plane. When the level adjusting motor 32 is driven at horizontal position and the laser projector 10 is moved along the horizontal plane via the tilting arm 26, it is possible to change a direction of the reference plane while maintaining verticality of the reference plane.

Next, description will be given on optical and electrical arrangement of the rotary irradiating system main unit 1 referring to FIG. 9 to FIG. 16.

Figure 3:
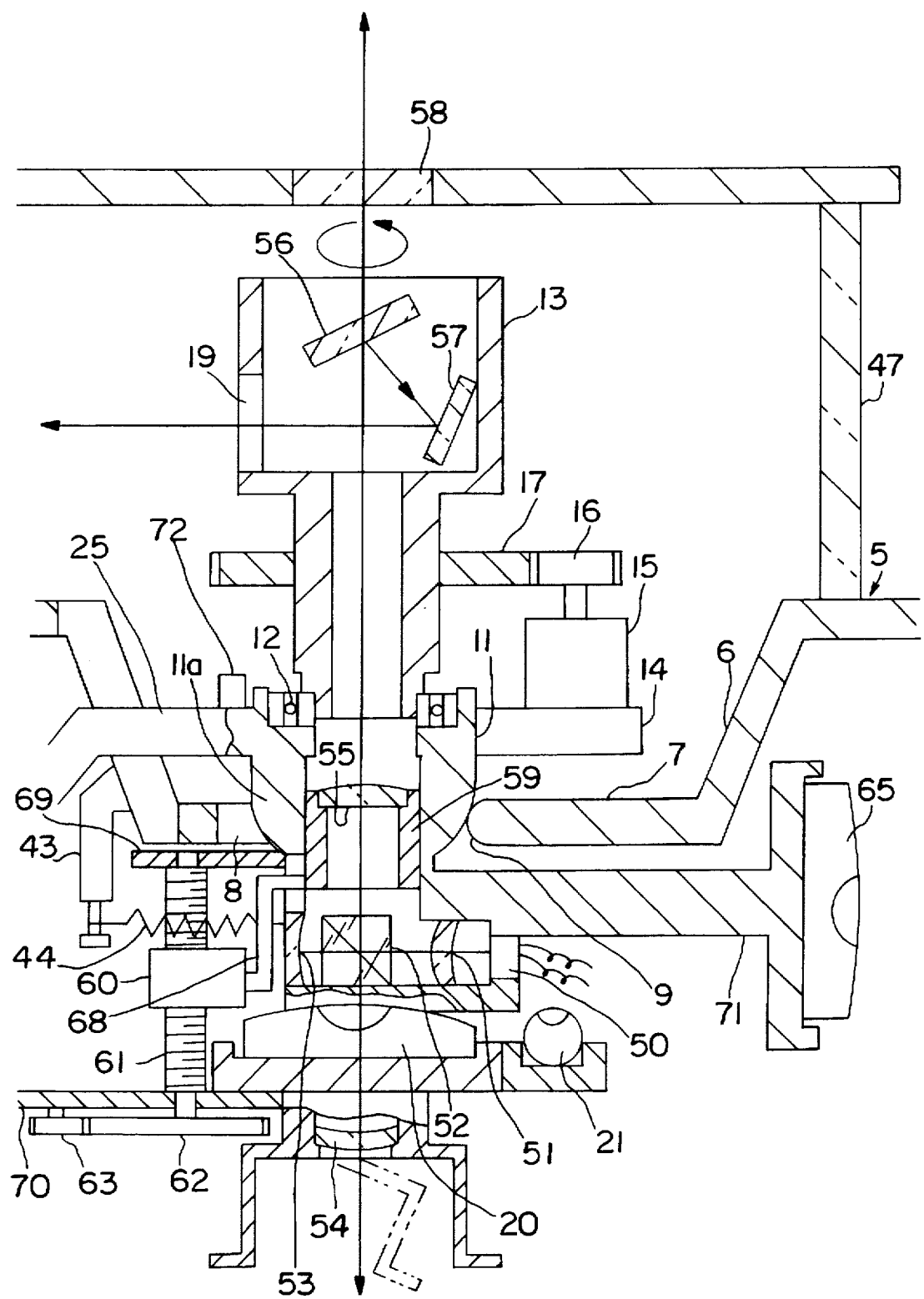
FIG. 3 is a partially enlarged view of an essential portion of the embodiment of FIG. 2.
Figure 4:
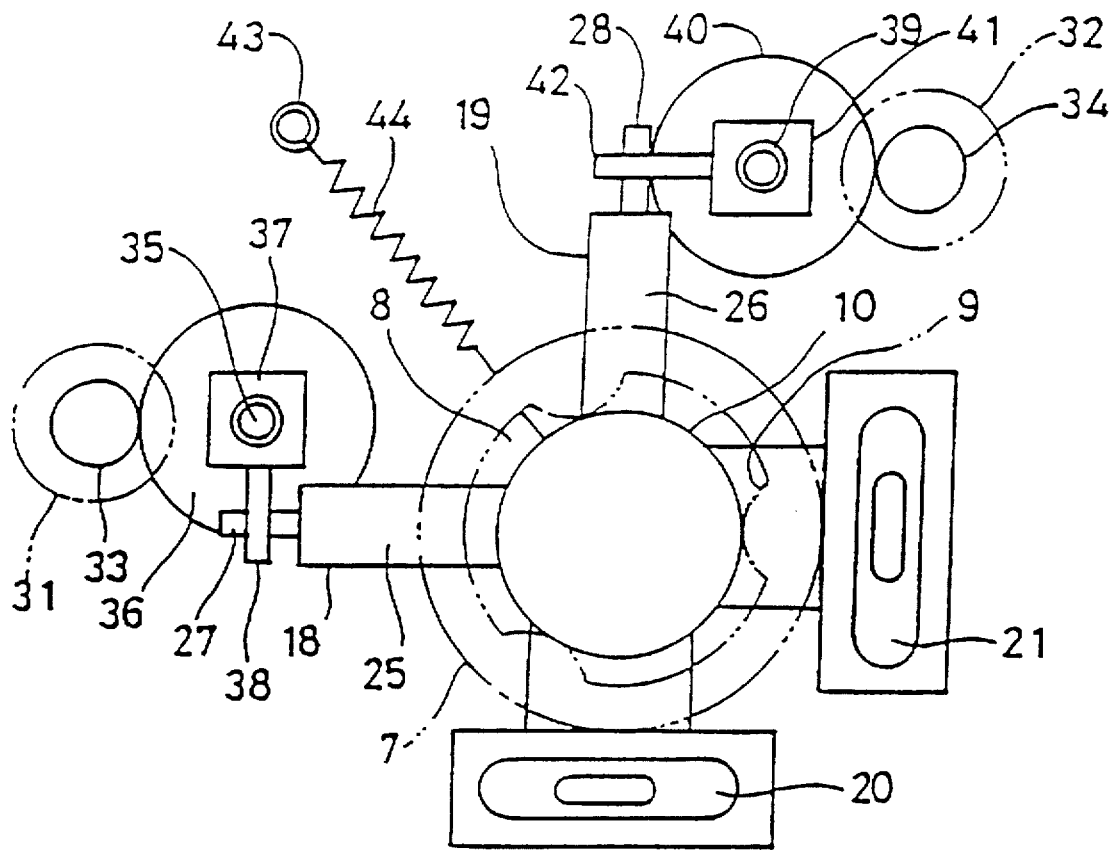
FIG. 4 is an arrow diagram along the line A—A of FIG. 2.
Figure 5:
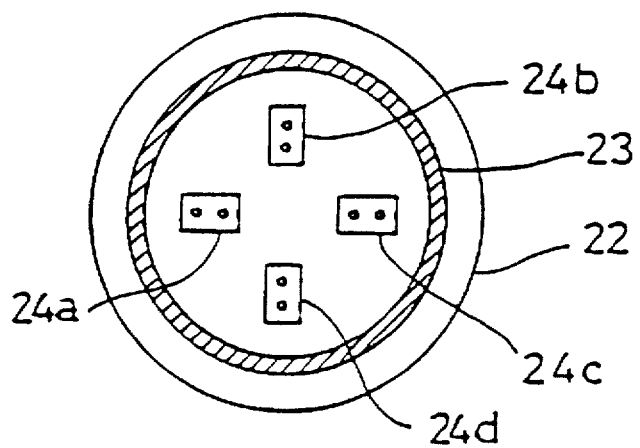
FIG. 5 is an arrow diagram along the line B—B of FIG. 2.
Figure 9:
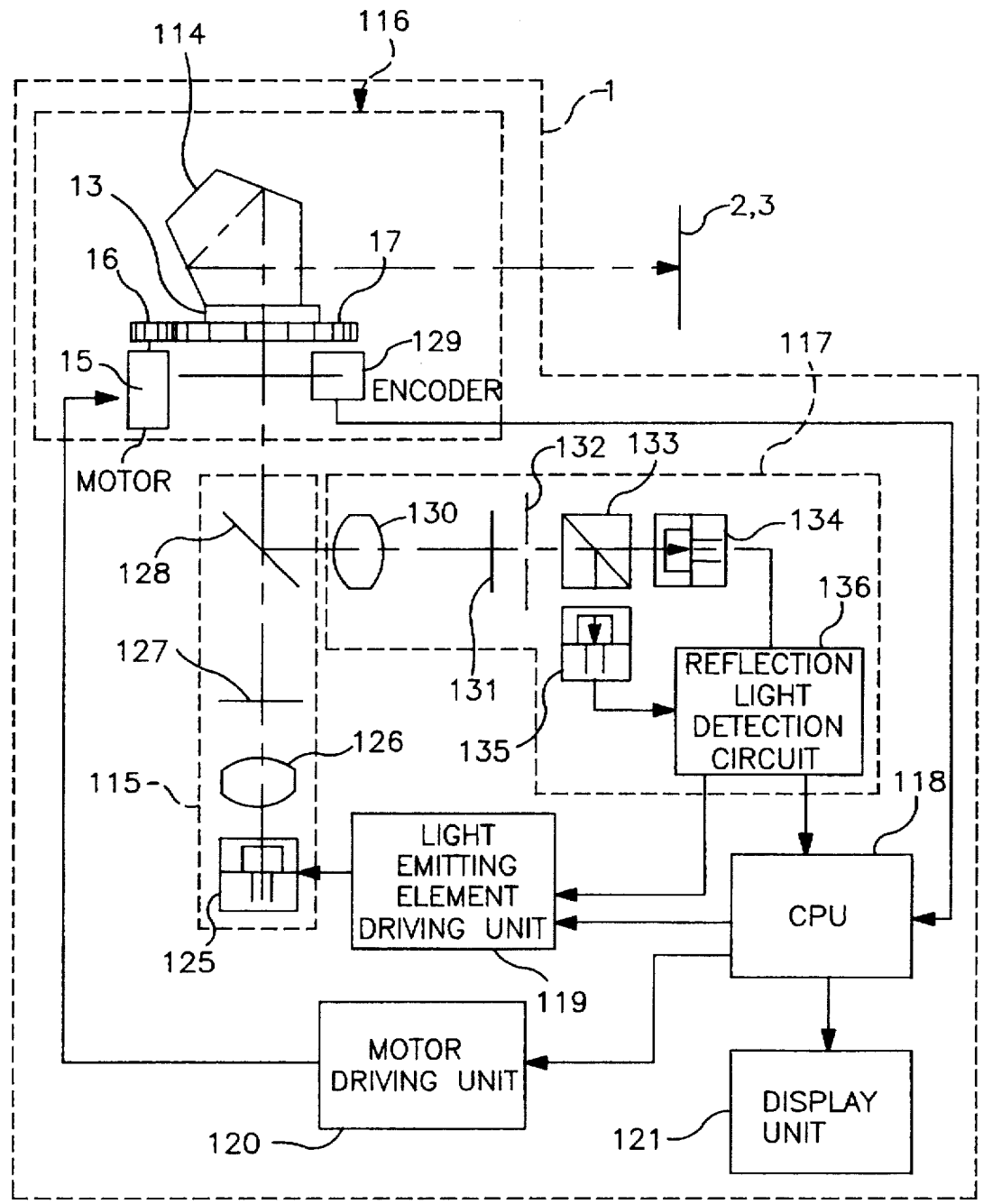
FIG. 9 represents an electrical and optical block diagram of the present embodiment.

In the figures, the same component as shown in FIG. 3 is referred by the same symbol. The rotary irradiating system main unit 1 comprises a light emitter 115, a rotating unit 116, a reflection light detector 117, a control unit (CPU) 118, a light emitting element driving unit 119, a motor driving unit 120, and a display unit 121. In FIG. 9, a pentagonal prism 114 is shown instead of the pentagonal half-mirror 56 and the pentagonal mirror 57.

Description is now given on the light emitter 115.

On the optical axis of a laser diode 125, which emits a linearly polarized irradiation light beam, a collimator lens 126, a first $\lambda/4$ birefringence member 127, and a perforated mirror 128 are arranged in this order as seen from the laser diode 125. The linearly polarized irradiation light beam emitted from the laser diode 125 is turned to parallel beams by the collimator lens 126 and is converted to a circularly polarized light by the first $\lambda/4$ birefringence member 127. The circularly polarized irradiation light beam passes through the perforated mirror 128 and is irradiated to the rotating unit 116.

The rotating unit 116 deflects an optical axis of the polarized irradiation light beam emitted from the light emitter 115 by 90° and irradiates it for scanning. The pentagonal prism 114 for deflecting an optical axis of the polarized irradiation light beam from the light emitter 115 by 90° is provided on the rotation support member 13, which is rotated around the optical axis of the polarized irradiation light beam. The rotation support member 13 is connected to the scanning motor 15 via the scanning gear 17 and the driving gear 16. The rotating condition of the rotation support member 13 is detected by an encoder 129, and a detection signal of the encoder 129 is inputted to the control unit (CPU) 118.

It is arranged that the polarized reflection light beams from the first object reflector 2 and the second object reflector 3 are irradiated to the rotating unit 116. The polarized reflection light beam entering the pentagonal prism 114 is deflected toward the perforated mirror 128, and the polarized reflection light beam is reflected by the perforated mirror 128 to the reflection light detection unit 117.

Next, description will be given on the reflection light detection unit 117.

On the reflection light optical axis of the perforated mirror 128, a condenser lens 130, a second $\lambda/4$ birefringence member 131, a pinhole 132, a polarization beam splitter 133, and a first photoelectric converter 134 are arranged in this order as seen from the perforated mirror 128, and a second photoelectric converter 135 is arranged on a reflection light optical axis of the polarization beam splitter 133. Outputs from the first photoelectric converter 134 and the second photoelectric converter 135 are inputted to a reflection light detection circuit 136.

The polarization beam splitter 133 splits the polarized reflection light beam entering the reflection light detecting unit 117 and irradiates the beams to the first photoelectric converter 134 and the second photoelectric converter 135. The second $\lambda/4$ birefringence member 131 and the polarization beam splitter 133 are arranged in such manner that the light beam having the same direction of polarization as that of the polarized reflection light beam, as emitted from the light emitter 115 and returning to the main unit after passing through the λ/4 birefringence member twice, enters the first photoelectric converter 134, and that the polarized reflection light beam returning to the main unit with the same direction of polarization as that of the polarized irradiation light beam emitted from the light emitter 115 enters the second photoelectric converter 135.

Figure 10:
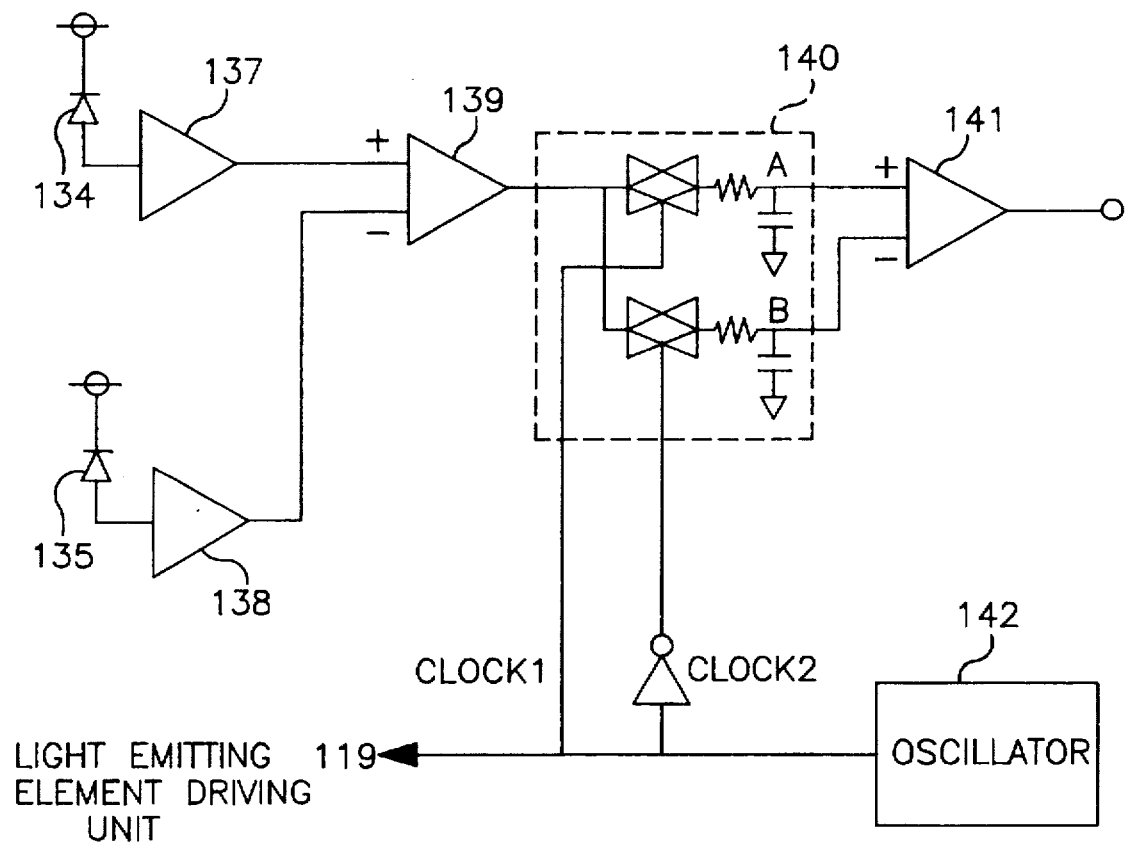
FIG. 10 is a block diagram of a reflection light detection circuit of the present embodiment.

An example of the reflection light detection circuit 136 is described referring to FIG. 10.

Outputs from the first photoelectric converter 134 and the second photoelectric converter 135 are inputted to a differential amplifier 139 via amplifiers 137 and 138. Output of the differential amplifier 139 is inputted to a differential amplifier 141 via a synchronous detector 140. Output of the differential amplifier 141 is inputted to the control unit (CPU) 118.

The reflection light detection circuit 136 is provided with an oscillator 142. The oscillator 142 outputs a clock signal necessary for synchronous detection to the synchronous detector 140 and also issues a clock signal for pulse modulation of the laser diode 125 to the light emitting element driving unit 119.

Next, description will be given on the control unit (CPU) 118.

To the control unit (CPU) 118, signals from the encoder 129 and the reflection light detection unit 117 are inputted. Positions of the first object reflector 2 and the second object reflector 3 as well as widths of a polarization converting reflection sector (to be described later) and a reflection sector (to be described later) are detected, and the rotating unit 116 is rotated and controlled via the motor driving unit 120. From the relationship of the widths of a polarization converting reflector sector (to be described later) and a reflection sector (to be described later) of the second object reflector 3, the polarized irradiation light beam detects a position of scanning on the second object reflector 3 as a scanning position signal. Based on the scanning position signal, the position of scanning on the second object reflector 3 is displayed on the display unit 121. Light emitting status of the laser diode 125 is controlled via the light emitting element driving unit 119 according to rotating status of the rotating unit.

Next, description will be given on the light emitting element driving unit 119.

The light emitting element driving unit 119 obtains the clock signal for pulse modulation from the reflection light detection circuit 136 and performs pulse modulation of the polarized irradiation light beam emitted from the laser diode 125. By pulse modulation, it is possible to easily amplify photodetection signal and to decrease noise level.

Next, the motor driving unit 120 will be described.

Based on a rotating direction signal from the control unit 118, the motor driving unit 120 rotates and controls the scanning motor 15 of the rotating unit 116 and controls scanning of the polarized irradiation light beam.

Next, description will be given on the display unit 121.

The display unit 121 displays a position of scanning on the second object reflector 3 based on a scanning position signal from the control unit 118.

Figure 11:
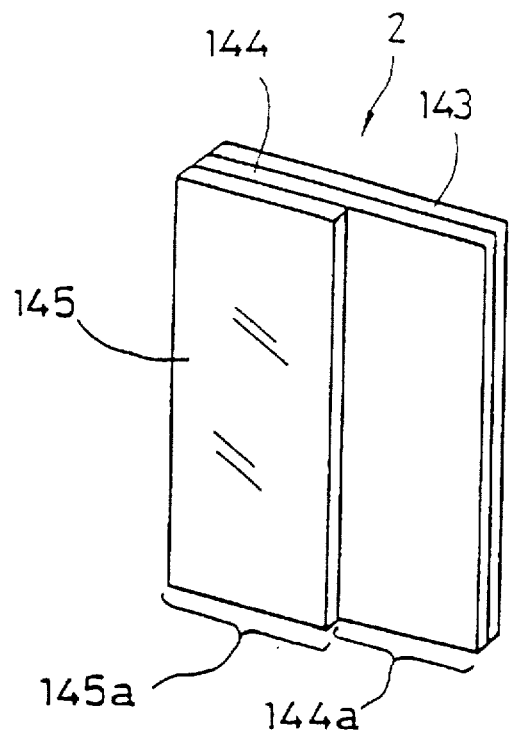
FIG. 11 is a perspective view to explain a first object reflector.

Next, description will be given on the first object reflector 2 referring to FIG. 11.

A reflection layer 144 is formed on a base plate 143. A λ/4 birefringence member 145 is attached on left half of the base plate in the figure. Thus, an exposed portion of the reflection layer 144 serves as a polarization maintaining reflection sector 144a, which reflects a light while maintaining the direction of polarization of the incident light beam, and a portion where the λ/4 birefringence member 145 is attached serves as a polarization converting reflection sector 145a, which reflects a light by converting the direction of polarization of the incident light beam. Width of each of the polarization maintaining reflection sector 144a and the polarization converting reflection sector 145a are kept at a constant value. The reflection layer 144 consists of a retroreflection material and comprises a plurality of fine corner cubes or spherical reflectors, etc. The reflection surface where the λ/4 birefringence member 145 is attached exerts such action that a phase difference of λ/2 is generated by the polarized reflection light beam with respect to the incident light beam. Therefore, the reflection light beam passes through the λ/4 birefringence member 145 twice with respect to the incident light beam. When a circularly polarized light enters, the reflection light is turned to a circularly polarized light with reversal rotation, and when a linearly polarized light enters, the reflection light has a polarization plane perpendicular to the incident light.

Figure 12:
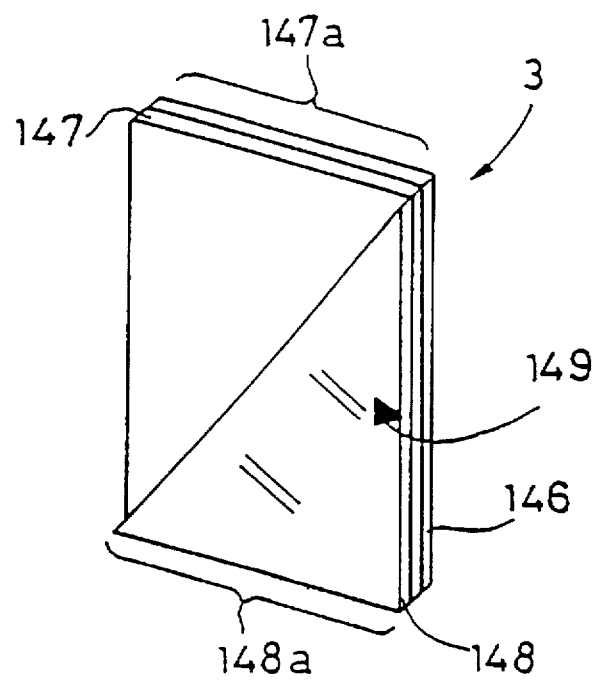
FIG. 12 is a perspective view to explain a second object reflector.

Next, description will be given on the second object reflector referring to FIG. 12.

A reflection layer 147 is formed on a base plate 146. The reflection surface is divided into two portions along a diagonal line running from right upper corner to left lower corner in the figure, and a λ/4 birefringence member 148 is attached on right half of the reflection surface. Thus, an exposed portion of the reflection layer 147 on left half serves as a polarization maintaining reflection sector 147a, which reflects a light beam while maintaining the direction of polarization of the incident light beam, and a portion of right half of the reflection surface where the λ/4 birefringence member 148 is attached serves as a polarization converting reflection sector 148a, which reflects a light beam while converting the direction of polarization with respect to the incident light beam. Widths of the polarization maintaining reflection sector 147a and the polarization converting reflection sector 148a are kept in a predetermined relationship, e.g. it is arranged in such manner that a width of the polarization maintaining reflection sector 147a is linearly decreased from below toward above, and a width of the polarization converting reflection sector 148a is linearly increased. In FIG. 12, the polarization maintaining reflection sector 147a and the polarization converting reflection sector 148a are divided by a diagonal line on the reflection layer 147, but it is not limited to this. The reflection layer 147 consists of a retroreflection material and comprises a plurality of fine corner cubes or spherical reflectors, etc. As described above, the λ/4 birefringence member 148 exerts such action that a phase difference of λ/2 is generated by the polarized reflection light beam with respect to the incident light beam.

In the following, description will be given on operation and detecting method of the first object reflector 2 and the second object reflector 3.

The polarized irradiation light beam emitted from the laser diode 125, which is driven by the light emitting element driving unit 119, is modulated based on a clock signal from the oscillator 142. A linearly polarized irradiation light beam emitted from the laser diode 125 is turned to parallel beams by the collimator lens 126 and is further turned to a circularly polarized irradiation light beam after passing through the first λ/4 birefringence member 127. The circularly polarized irradiation light beam passes through the perforated mirror 128, is deflected by 90° by the pentagonal prism 114, and is irradiated from the rotary irradiating system main unit 1.

The pentagonal prism 114 is rotated by the scanning motor 15 via the driving gear 16 and the scanning gear 17. At first, the pentagonal prism 114 is rotated over total circumference. Thus, the polarized irradiation light beam irradiated from the pentagonal prism 114 scans over total circumference.

When the polarized irradiation light beam scans the first object reflector 2 or the second object reflector 3 by total circumferential or all-round scanning, the polarized reflection light beam is reflected from the first object reflector 2 or the second object reflector 3, and the polarized reflection light beam enters the pentagonal prism 114.

As described above, the first object reflector 2 and the second object reflector 3 comprises the polarization maintaining reflection sectors 144a and 147a and the polarization converting reflection sectors 145a and 148a respectively. The polarized reflection light beam reflected by the polarization maintaining reflection sectors 144a and 147a is circularly polarized light, which maintains polarization conditions of the incident polarized irradiation light beam, and the polarized reflection light beam reflected by the polarization converting reflection sectors 145a and 148a is circularly polarized light with a phase deviated by $\lambda/2$ with respect to polarization conditions of the incident polarization irradiation light beam.

The polarized reflection light beam reflected by the first object reflector 2 or by the second object reflector 3 is deflected by 90° by the pentagonal prism 114 and enters the perforated mirror 128. The perforated mirror 128 reflects the reflection light beam toward the condenser lens 130. The condenser lens 130 turns the reflection light beam to a convergent light and irradiates it to the second $\lambda/4$ birefringence member 131. Returning as a circularly polarized light, the polarized reflection light beam is converted to a linearly polarized light by the second $\lambda/4$ birefringence member 131 and enters the pinhole 132. As described above, the phase of the polarized reflection light beam reflected by the polarization maintaining reflector sectors 144a and 147a is different from the phase of the polarized reflection light beam reflected by the polarization converting reflection sectors 145a and 148a by $\lambda/2$. Therefore, the two polarized reflection light beams converted to a linearly polarized light by the second $\lambda/4$ birefringence member 131 are different from each other by 90° in a polarization plane.

The pinhole 132 has such function that the reflection light beam, which has an optical axis deviated to that of the polarized irradiation light beam emitted from the main unit and not correctly directed (i.e. the reflection light beam coming from an unnecessary reflector other than the first object reflector 2 and the second object reflector 3), does not enter the first photoelectric converter 134 and the second photoelectric converter 135. After passing through the pinhole 132, the polarized reflection light beam enters the polarization beam splitter 133.

The polarization beam splitter 133 splits the light beam into polarized components crossing perpendicularly each other. It allows the polarized reflection light beam which is to pass, similar to the polarized irradiation light beam emitted from the laser diode 125 (with direction of polarization deviated by 180°), and it reflects the polarized reflection light beam, which has a direction of polarization deviated by 90° from that of the polarized irradiation light beam emitted from the laser diode 125. The first photoelectric converter 134 and the second photoelectric converter 135 receive the split polarized reflection light beams respectively.

Light receiving conditions of the first photoelectric converter 134 and the second photoelectric converter 135 are as follows: When the polarized reflection light beam reflected by the polarization converting reflection sector of the first object reflector 2 or the second object reflector 3 enters the reflection light detection unit 117, the amount of light entering the photoelectric converter 134 is more than the amount of light entering the second photoelectric converter 135 because of the relationship between the second $\lambda/4$ birefringence member 131 and the polarization beam splitter 133. As a result, when the polarized reflection light beam reflected by the polarization maintaining reflection sector of the first object reflector 2 or the second object reflector 3 or by an unnecessary reflector enters the reflection light detection unit 117, the amount of light entering the second photoelectric converter 135 is more than the amount of light entering the first photoelectric converter 134.

Therefore, by finding the difference of the polarized reflection light beams to the first photoelectric converter 134 and the second photoelectric converter 135, it is possible to identify whether the incident polarized reflection light beam has been reflected by the polarization maintaining reflection sector of the first object reflector 2 or the second object reflector 3 or it has been reflected by the polarization converting reflection sector.

Figure 13:
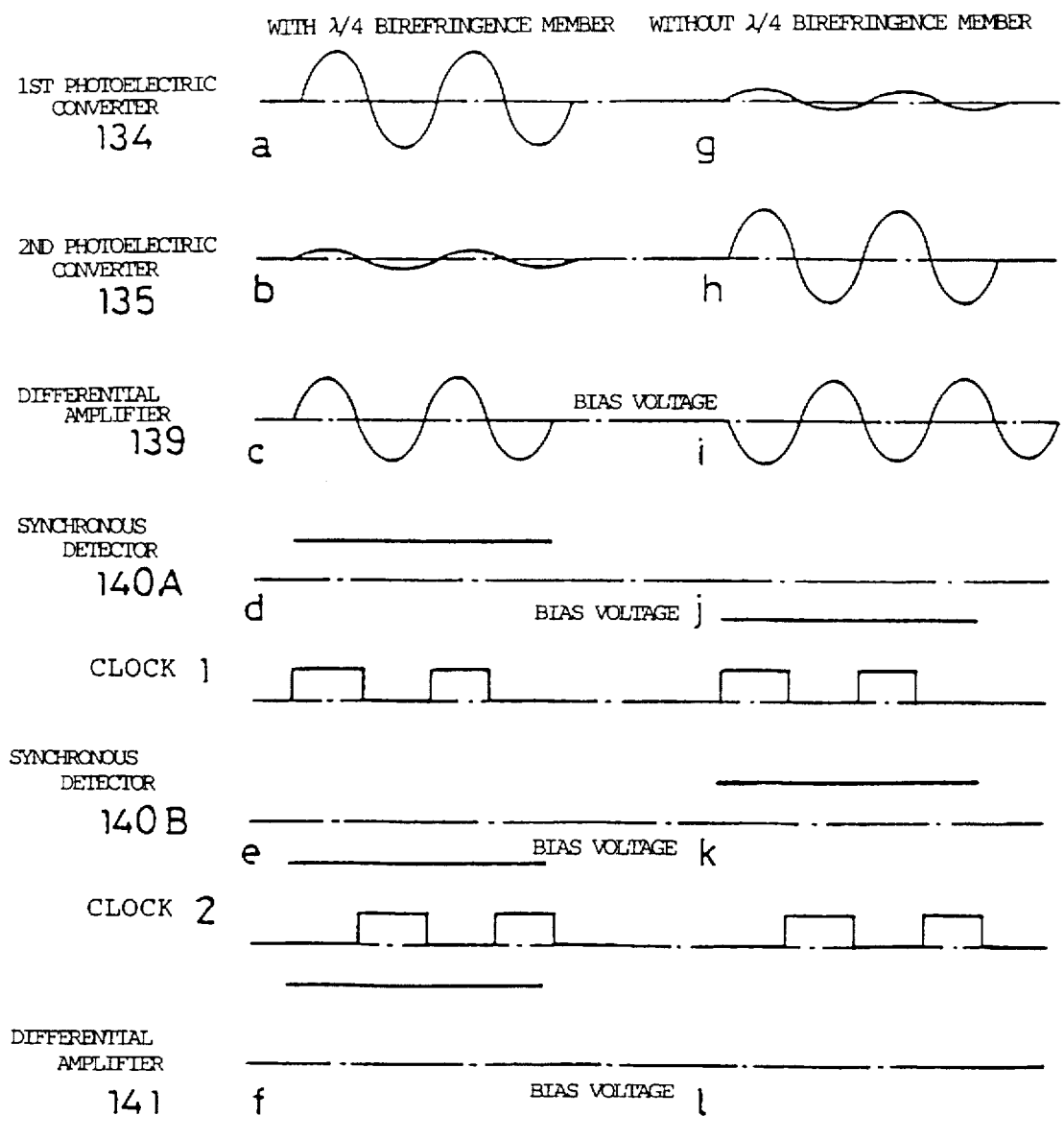
FIG. 13 represents signal waveforms on said reflection light detection circuit block FIG. 14 (A) and FIG. 14 (B) each represents relationship between the first object reflector and the reflection light receiving signal from the first object reflector.

Further, detailed description will be given referring to FIG. 13.

In case of the polarized reflection light beam reflected by the polarization converting reflection sector of the first object reflector 2 or the second object reflector 3, the amount of light entering the first photoelectric converter 134 is more than the amount of light entering the second photoelectric converter 135. Signals in such case are shown in "a" and "b" of FIG. 13. The signals from the photoelectric converters 134 and 135 are amplified by the amplifiers 137 and 138, and the difference of signals is obtained by the differential amplifier 139. The signal in this case is shown in FIG. 13 "c". When an output signal of the differential amplifier 139 is checked by synchronous detection at a clock 1 from the oscillator 142, a positive voltage (shown in "d" of FIG. 13) to a bias voltage is obtained. When checked by synchronous detection at a clock 2, a negative voltage (shown by "e" in FIG. 13) to a bias voltage is obtained. By taking a difference from the signal obtained by synchronous detection (d–e), a positive voltage (shown by "f" in FIG. 13) to a bias voltage is obtained in the output of the differential amplifier 141.

In case of the polarized reflection light beam reflected by the polarization maintaining reflection sector of the first object reflector 2 or the second object reflector 3, the amount of light entering the second photoelectric converter 135 is more than the amount of light entering the first photoelectric converter 134. The signals in this case are shown by "g" and "h" of FIG. 13. The signals from the photoelectric converters 134 and 135 are amplified by the amplifiers 137 and 138, and the difference of signals is obtained by the differential amplifier 139. This signal is given by "i" in FIG. 13. When an output signal of the differential amplifier 139 is checked by synchronous detection at a clock 1 from the oscillator 142, a negative voltage (shown by "j" in FIG. 13) to a bias voltage is obtained. When checked by synchronous detection at a clock 2, a positive voltage (shown by "k" in FIG. 13) to a bias voltage is obtained. By taking a difference of signals (j–k) obtained by synchronous detection, a negative voltage (shown by "l" in FIG. 13) to a bias voltage is obtained in the output of the differential amplifier 141.

Figure 14A:
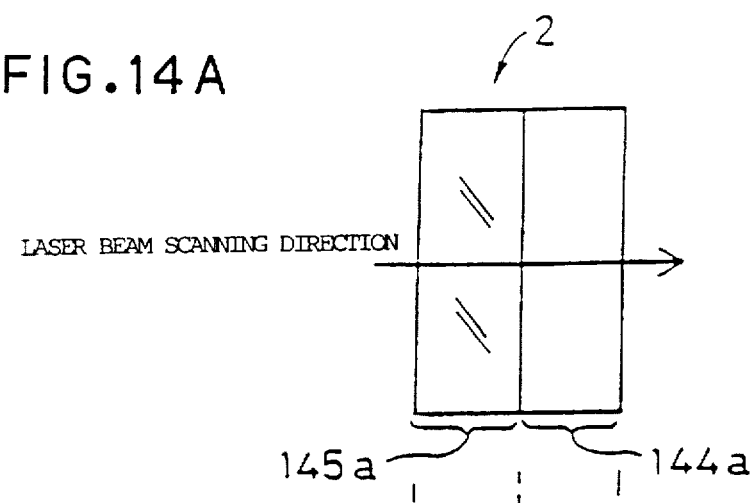
Figure 14B:
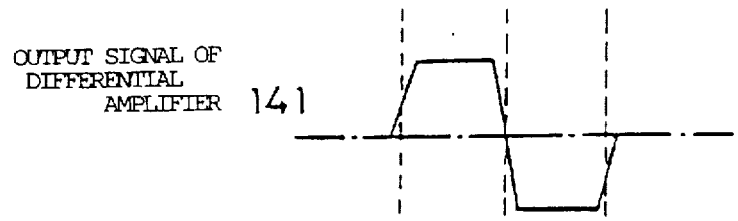

As shown in FIG. 14 (A), in case the first object reflector 2 is scanned by the polarized irradiation light beam, an output signal of the differential amplifier 141 of the reflection light detection circuit 136 has a symmetrical waveform as shown in FIG. 14 (B). In case a positive signal appears in the output of the differential amplifier 141 and falling of a negative signal occurs within a predetermined time from standing of the positive signal, it is identified as the first object reflector 2.

Figure 15A:
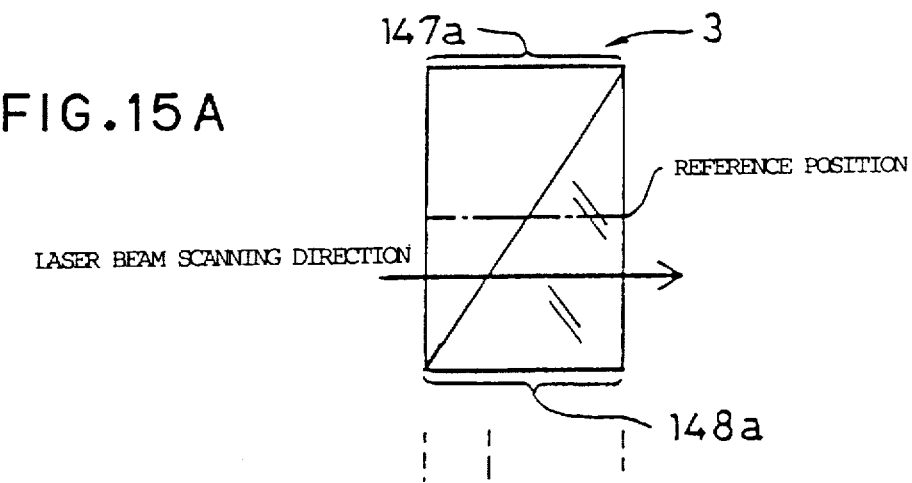
FIG. 15 (A) and FIG. 15 (B) each represents relationship between the second object reflector and the reflection light receiving signal from the second object reflector.
Figure 15B:
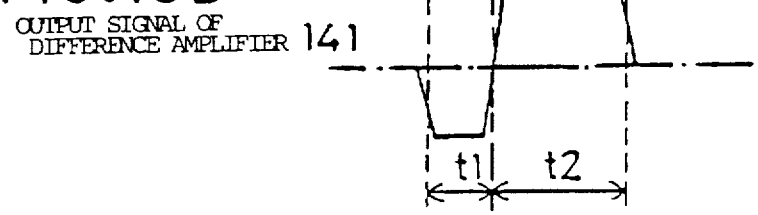

As shown in FIG. 15 (A), in case the polarized irradiation light beam scans the second object reflector 3, an output signal of the differential amplifier 141 of the reflection light detection circuit 136 takes a waveform having different positive and negative time amplitudes corresponding to the passing position of the light beam as shown in FIG. 15 (B). In case a negative signal appears in the output of the differential amplifier 141 and standing of the positive signal occurs within a predetermined time from the falling of the negative signal, it is identified as the second object reflector 3.

When the first object reflector 2 or the second object reflector 3 is identified, the control unit 118 controls and drives the scanning motor 15 via the motor driving unit 120. After reciprocal scanning of the pentagonal prism 114, reciprocal scanning on and around the first object reflector 2 or the second object reflector 3 is performed by the polarized irradiation light beam irradiated by the rotary irradiation system main unit 1.

When a scanning direction of the polarized irradiation light beam is reversed, the order of positive and negative signs of the output signal of the differential amplifier 141 of the reflection light detection circuit 136 is reversed. Therefore, a rotating direction of the polarized irradiation light beam with respect to the rotary irradiation system main unit 1 and the direction to scan the first object reflector 2 or the second object reflector 3 should be fixed.

Figure 16:
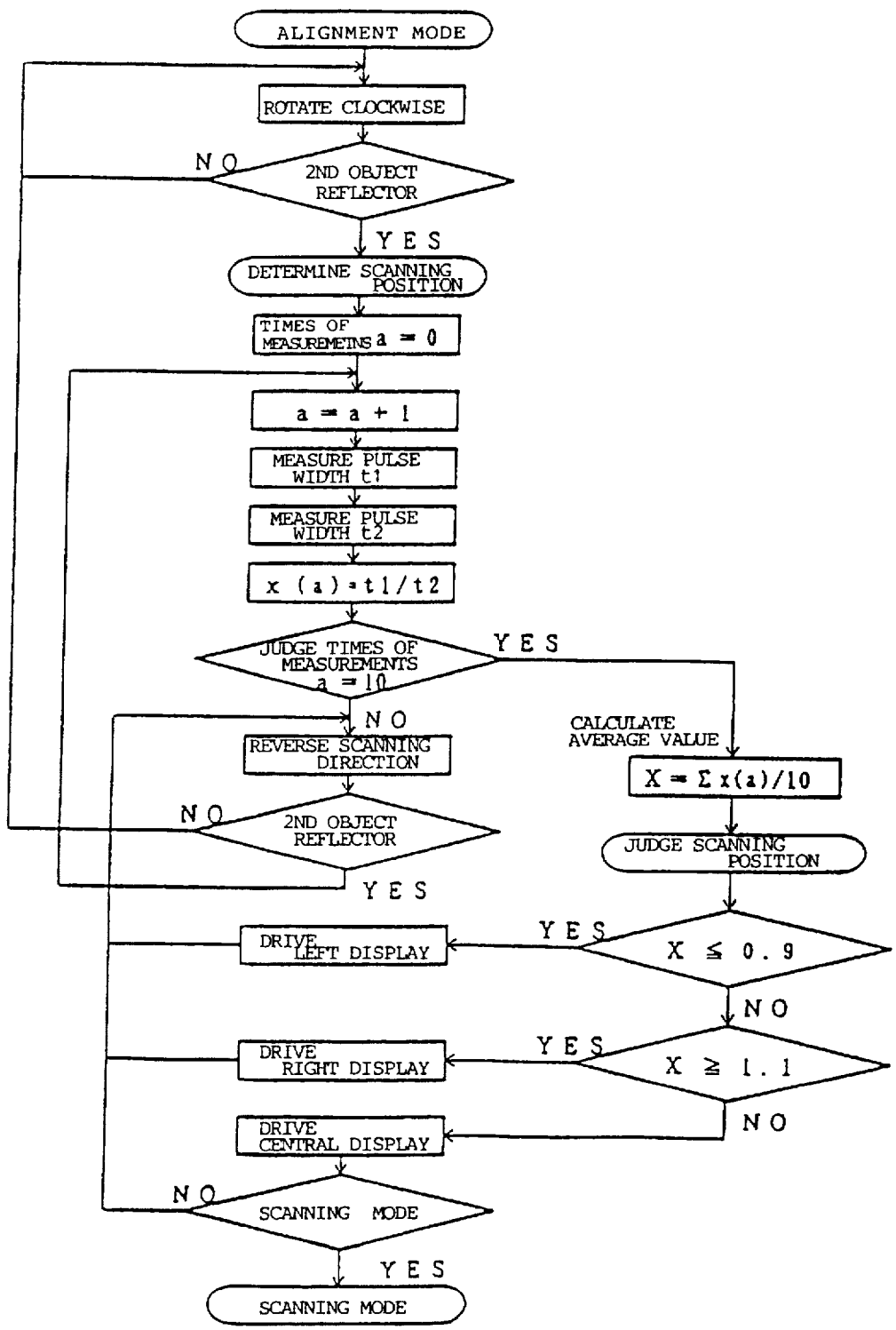
FIG. 16 is a flow chart of processing to detect scanning position based on the detection of reflection light from the object reflector.
Figure 17:
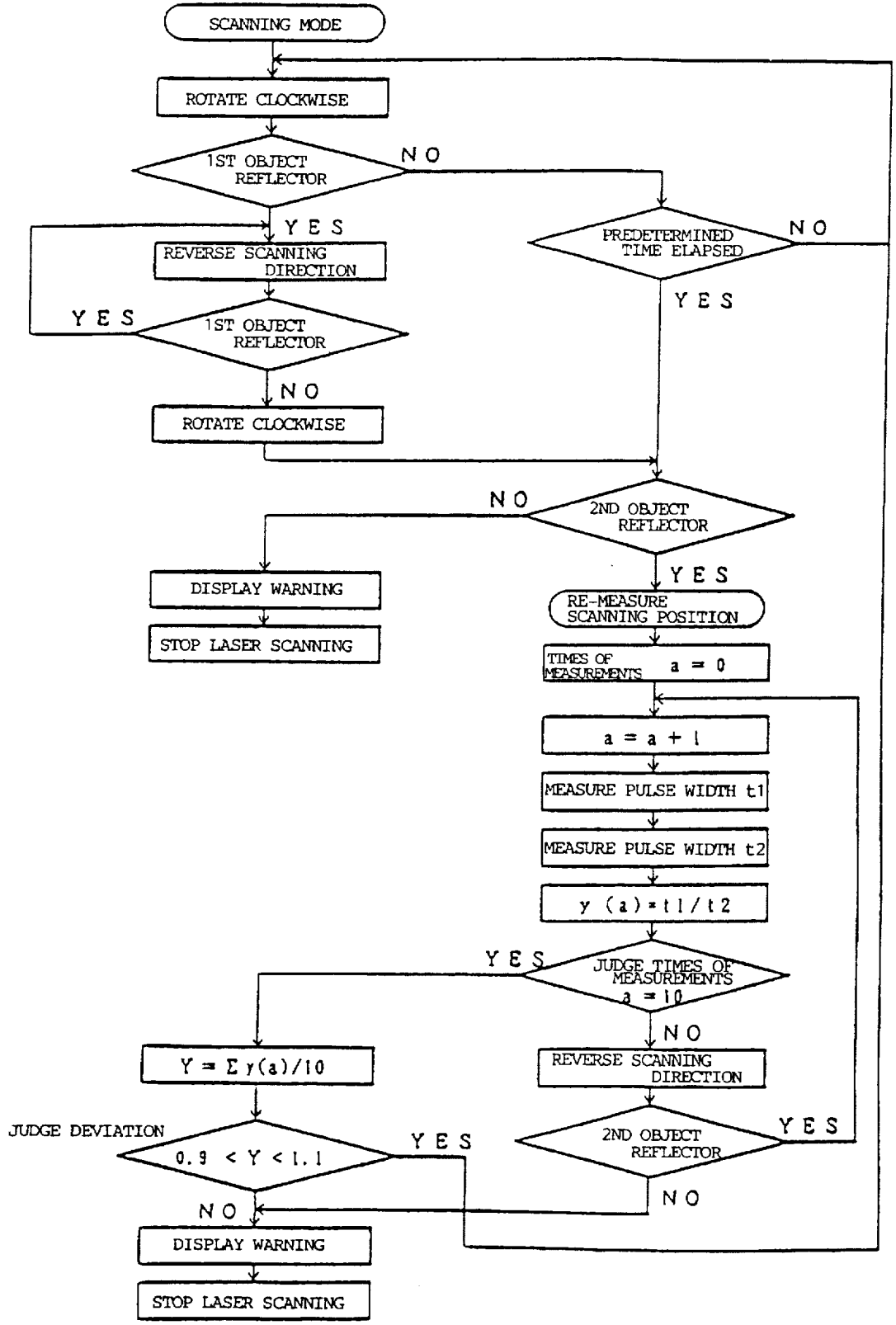
FIG. 17 is a flow chart of processing to detect scanning position based on the detection of reflection light from the object reflector.

Next, description will be given on scanning operation of the polarized irradiation light beam of the present embodiment, referring to FIG. 1, FIG. 16 and FIG. 17.

The rotary irradiation system main unit 1 is installed by aligning a point vertically below the laser rotation axis of the rotary irradiating system main unit 1 with a first reference point O on a setting-out line 4. The second object reflector 3 is placed by aligning a reference position of the second object reflector 3 with a second reference point O' on the setting-out line far from the main unit. Reference position of the second object reflector is indicated by an installation mark 149. The system is started, and the polarized irradiation light beam is rotated at a constant rate for all-round or total circumferential scanning in an alignment mode. When the second object reflector 3 is detected, the time t1 and the time t2 are timed. The time t1 is the time when signal of the differential amplifier 141 of the reflection light detection circuit 136 is a negative signal, and the time t2 is the time when it is a positive signal. The ratio x (a)=t1/t2 is obtained. A scanning direction of the polarized irradiation light beam is reversed, and the value of x (a) is obtained in similar manner. Further, the polarized irradiation light beam is irradiated for reciprocal scanning, and the value of x (a) is measured repeatedly by 10 times. The measured values of x (a) are averaged, and an irradiation position signal X is obtained. If the irradiation position signal X is 0.9 or less, a display on the left portion of the display unit 121 is driven, and it is indicated that the left portion from the reference position of the second object reflector 3 is scanned by the polarized irradiation light beam. If the irradiation position signal X is 1.1 or more, a display on the right portion of the display unit 121 is driven, and it is indicated that the right portion from the reference position of the second object reflector 3 is scanned by the polarized irradiation light beam. If the irradiation position signal X is more than 0.9 and less than 1.1, a central display of the display unit 121 is driven, and it is indicated that the reference position of the second object reflector 3 is scanned by the polarized irradiation light beam. By moving the rotary irradiating system main unit 1 according to the display of the display unit 121, the reference plane formed by the polarized irradiation light beam can be aligned with the setting-out line.

To judge whether the position scanned by the polarized irradiation light beam on the second object reflector 3 is on the right side or on the left side with respect to the reference position, judgment is made under the installing conditions of the rotary irradiation system main unit 1 and the second object reflector 3 shown in FIG. 1. Regarding the first reference point O and the second reference point O' shown in FIG. 1, in case the second reference point O' is at symmetrical position to the first reference point O, judgment on the scanning position with respect to the reference position is reverse to the judgment of the above method, and it is necessary to judge positional relationship between the first reference point O and the second reference point O' by the encoder 129. The second object reflector 3 is kept installed in subsequent operation.

The reference plane formed by the polarized irradiation light beam is aligned with the setting-out line 4 in the alignment mode. Next, using the first object reflector 2 in the scanning mode, the polarized irradiation light beam is irradiated to reciprocally scan the first object reflector 2, and the setting-out operation is performed to mark the line on a wall surface and the like.

In the scanning mode, the polarized irradiation light beam is rotated at a constant rate for all-round scanning, and the first object reflector 2 is detected. The light beam is irradiated to the first object reflector 2 for reciprocal scanning, and when the first object reflector 2 is no more detected or when the polarized irradiation light beam is rotated at a constant rate for all-round scanning and the first object reflector 2 is not detected for a predetermined period of time, the scanning position is measured again.

In the re-measurement of the scanning position, the polarized irradiation light beam is rotated at a constant rate for all-round scanning, and the second object reflector 3 is detected. In case the second object reflector 3 cannot be detected, the re-measurement of the scanning position cannot be performed. It is warned and displayed that positional relationship between the rotary irradiation system main unit 1 and the second object reflector 3 is deviated. The scanning of the polarized irradiation light beam is stopped, and the setting-out operation is stopped. When the polarized irradiation light beam is rotated at a constant rate for all-round scanning and the second object reflector 3 is detected, the time t1 when the signal of the differential amplifier 141 of the reflection light detection circuit 136 is a negative signal and the time t2 when it is a positive signal are measured, and the ratio y (a)=t1/t2 is obtained. By reversing the scanning direction of the polarized irradiation light beam, the value of y (a) is obtained in similar manner. Further, the polarized irradiation light beam is irradiated for reciprocal scanning, and the value of y (a) is repeatedly measured by 10 times. The measured values of y (a) are averaged, and the irradiation position signal Y is obtained.

If the irradiation position signal Y is more than 0.9 and less than 1.1, it is judged that the positional relationship between the rotary irradiating system main unit 1 and the second object reflector 3 is not deviated. It is turned to the scanning mode. The polarized irradiation light beam is rotated at a constant rate for all-round scanning, and the first object reflector 2 is detected, and the next setting-out operation is started. If the irradiation position signal Y is 0.9 or less or 1.1 or more, it is judged that the positional relationship between the rotary irradiation system main unit 1 and the second object reflector 3 is deviated, and it is warned and displayed that positional relationship of the second object reflector 3 is deviated. The scanning of the polarized irradiation light beam is stopped, and the setting-out operation is stopped.

In the present embodiment, widths of the reflection sector and the polarization converting reflection sector are changed in a proportional relationship and the center of the second object reflector is regarded as the reference position to facilitate the detection of the irradiation position, while the method to judge the irradiation position signal is not limited to this.

In case the irradiation position signal is measured from the time when each of the polarized reflection light beams reflected from the second object reflector 3 is obtained, the speed of scanning on the second object reflector 3 by the polarized irradiation light beam must be maintained approximately at the constant level.

In the present embodiment, the irradiation position signal is measured from the time when the polarized reflection light beam is obtained, while an angle, at which each of the polarized reflection light beams reflected from the second object reflector 3 is obtained, may be detected by the encoder mounted coaxially with the rotation shaft of the pentagonal prism of the rotating unit, and the irradiation position signal may be obtained from its relation.

Figure 18:
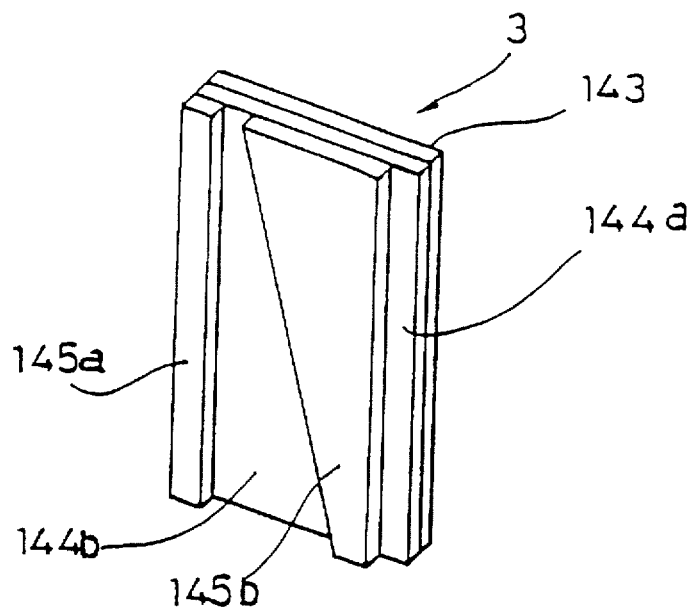
FIG. 18 is a perspective view of another example of the second object reflector.
Figure 19A:
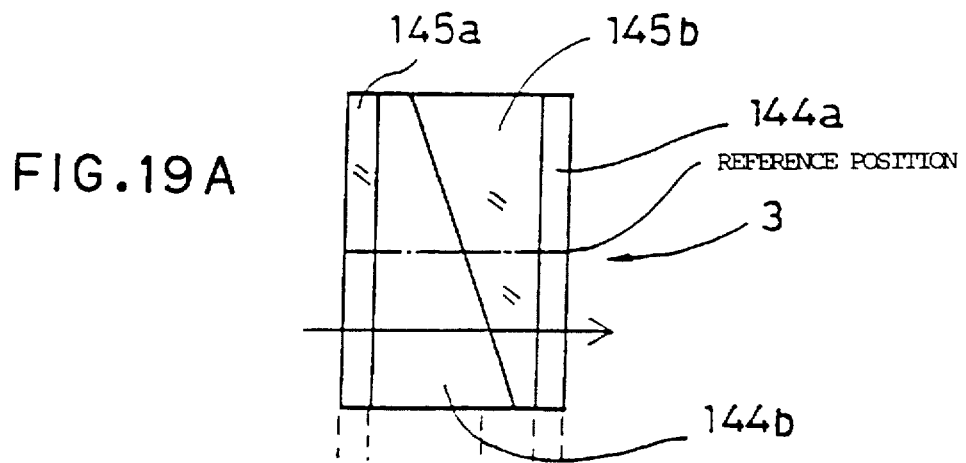
FIG. 19 (A) and FIG. 19 (B) each represents relationship between said another second object sector and reflection light receiving signal from the second object reflector.
Figure 19B:
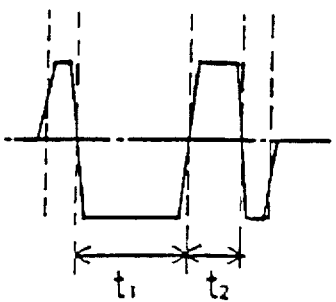

Next, description will be given on another example of the second object reflector 3 referring to FIGS. 18, 19 (A) and 19 (B).

On this example of the second object reflector 3, a λ/4 birefringence member 145a in form of an oblong tablet is provided along the left edge. A λ/4 birefringence member 145b in form of an inverted triangle is arranged opposite to the above λ/4 birefringence member 145a with a reflection layer 144b of an erected triangle between them, and a reflection layer 114a in form of an oblong tablet is provided along the right edge. When this second object reflector 3 is scanned by laser beam, an output signal from the differential amplifier 141 is as shown in FIG. 19 (B), and signal waveform is asymmetrical. Therefore, even when the center of the second object reflector 3 is scanned by the laser beam, unlike the case of the second object reflector 3, the output signal from the differential amplifier 141 is not symmetrical, and output waveform is different from that of the first object reflector 2. Accordingly, the first object reflector 2 can be discriminated from the second object reflector 3 by the output of the differential amplifier 141, and the scanning direction of the laser beam can be identified only by the output signal from the differential amplifier 141.

Normally, when the laser beam reflected from the object reflector is received, a light receiving signal does not rise up as soon as the light beam is received, and it rises up with an inclination associated with some ambiguity in the same manner as in the case where the center of spot light of the reflection laser beam is bright. In the second object reflector 3 shown in FIG. 18, the reflection sectors 144a and 145a each in form of an oblong tablet are formed on two ends of the reflection sectors 144b and 145b each in form of a triangle respectively. As a result, the switch-over point of the light receiving signal can be easily identified, and the center position can be detected at high accuracy. Because the up-down direction can be judged from the object reflector itself, when the rotary irradiating system main unit 1 is installed on the floor or the like, the light beam can be easily distinguished from the reflection light reflected by the floor surface.

The λ/4 birefringence member 145b in form of an inverted triangle, by which the center position of the second object reflector 3 can be judged, may be designed in V-shaped or cone-shaped form with extreme value at the center. Its shape is not limited to the above, and any shape may be adopted so far as there is change in width in up-down positions and the center position can be detected by width change.

Description will be given now on another example of the first object reflector 2 referring to FIGS. 20, 21 (A), and 21 (B). In this example of the first object reflector 2, reflection layers 144a and 144b each in form of an oblong tablet are provided at the left and right of the base plate 143 respectively so that the central portion of the base plate 143 is exposed in form of an oblong tablet. Also, on the right half of each of the reflection layers 144a and 144b, λ/4 birefringence members 145a and 145b are provided respectively. As a result, two sets of combined reflection sectors, comprising a combination of a polarization maintaining reflection sector and a polarization converting reflection sector, are prepared. The reflection layers 144a and 144b may be provided in such manner that not only the central portion of the base plate 143 but also peripheral portions are exposed. Also, there may be three sets or more of the combined reflection sectors.

Figure 21A:
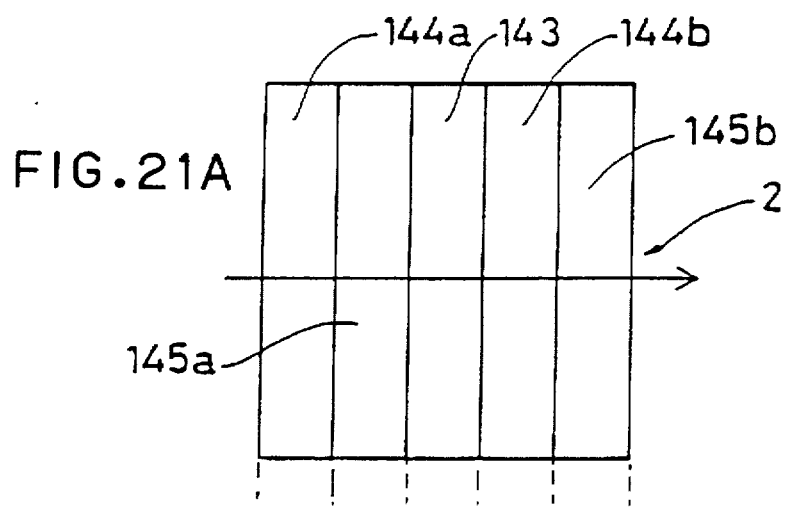
FIG. 21 (A) and FIG. 21 (B) represents relationship between said another first object reflector and he reflection light receiving signal from another first object reflector.
Figure 21B:
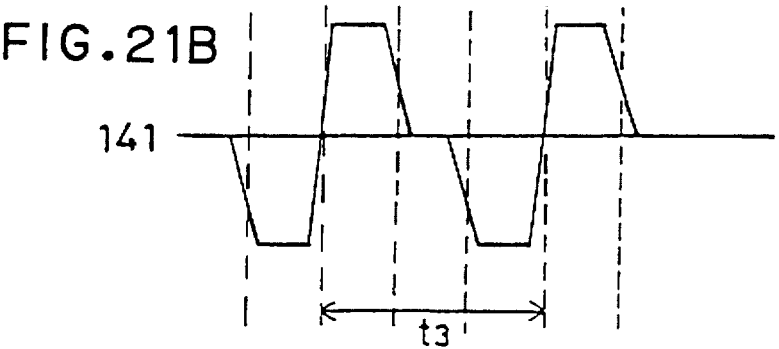

When the first object reflector 2 with the above arrangement is scanned by laser beam as shown in FIG. 21 (A), an output signal from the differential amplifier 141 is as shown in FIG. 21 (B). Thus, two signals are obtained, which are clearly divided by the non-reflection sector and have positive and negative signals turned reversely. By detecting the signal at the reversal of positive-negative, ambiguity of rise-up of the signal can be eliminated, and it is accurately and reliably confirmed that it is the reflection light beam from the object reflector. Further, the time difference t3 of the two positive-negative reversing signals is specific to the first object reflector 2. Thus, by detecting the time difference t3, it is possible to accurately confirm that it is the first object reflector 2. Even when there is a reflection light from laminated glass, no erroneous operation occurs.

Figure 20:
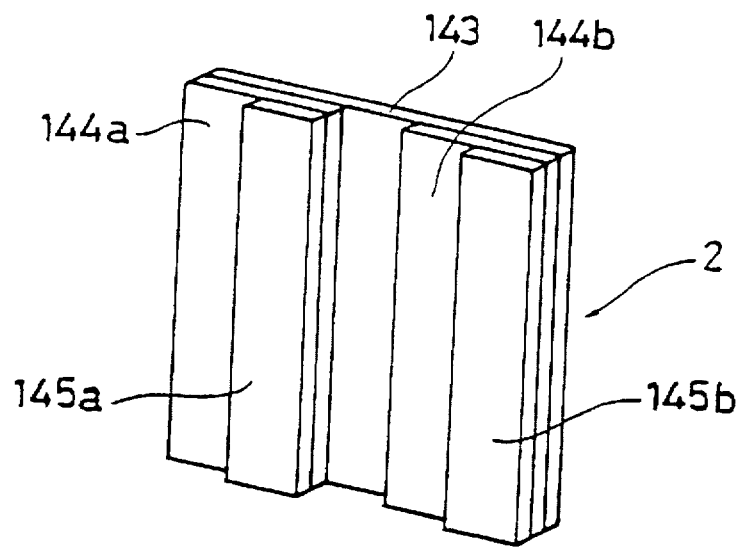
FIG. 20 is a perspective view of another example of the first object reflector.

When the time t3 of the output signal (See FIG. 21 (B)) from the differential amplifier 141 is measured in case the laser beam scans the first object reflector 2 shown in FIG. 20, a distance between the rotary irradiating system main unit 1 and the first object reflector 2 can be calculated because the scanning speed and the spacing of borders between the polarization maintaining reflection sector and the polarization converting reflection sector of the first object reflector 2 are already known. Similarly, when the time values of output signals t1 and t2 (See FIG. 19 (B)) from the differential amplifier are measured in case the laser beam scans the second object reflector 3 shown in FIG. 18, a distance between the rotary irradiating system main unit 1 and the second object reflector 3 can be calculated from the sum of these two values. Also, the laser beam can be focused on the object reflectors 2 and 3 based on the calculated distance.

The above method to calculate the distance is based on time measurement. However, when an angle of rotation of the laser beam in the time value of t3 of FIG. 21 (B) for the first object reflector 2 and an angle of rotation of the laser beam in the time values of t1 and t2 of FIG. 19 (B) for the second object reflector 3 are measured by the encoder 129, the distance between the rotary irradiating system main unit 1 and the object reflectors 2 or 3 can be calculated because dimensions of the object reflectors 2 and 3 are already known. Further, the irradiated laser beam can be focused on the object reflectors 2 or 3 based on the calculated distance.

Figure 22:
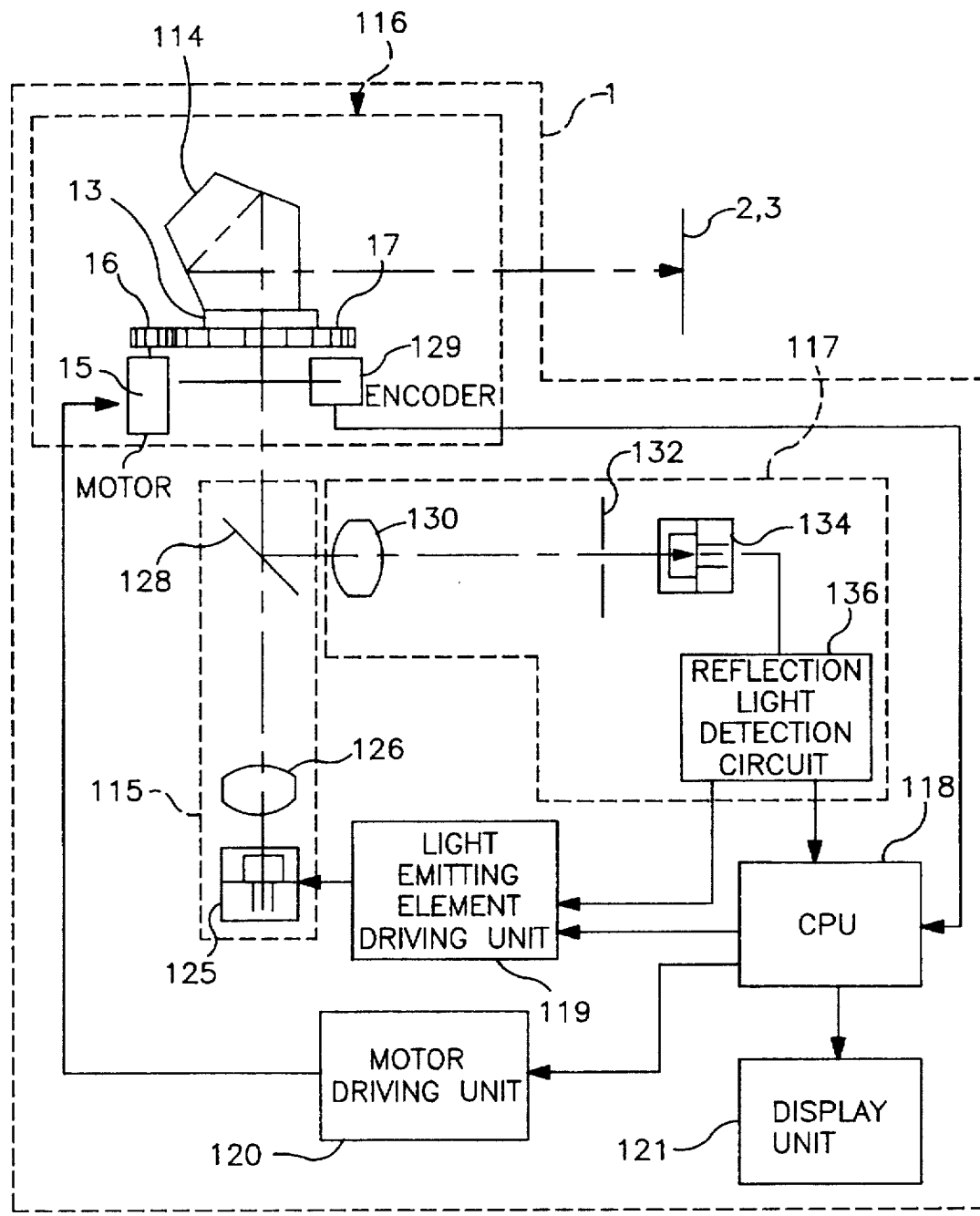
FIG. 22 is a control block diagram showing another embodiment of the present invention.

In the above embodiment, a λ/4 birefringence member is used for each of the first object reflector 2 and the second object reflector 3. By adequately modifying the first object reflector 2 and the second object reflector 3, the irradiation position can be confirmed without using the λ/4 birefringence member. Referring to FIG. 22, description will be given below on optical and electrical arrangements of the rotary irradiating system main unit 1 of the laser rotary irradiating system using the first object reflector 2 and the second object reflector 3, which adopt no λ/4 birefringence member.

In the present embodiment, it is not necessary that the laser beam irradiated from the light emitter 115 is circularly polarized light, and there is no need to detect components of the laser beam entering the rotary irradiating system main unit 1 with respect to the direction of polarization. Accordingly, from the embodiment shown in FIG. 9, the following components may be omitted: the first λ/4 birefringence member 127, the second λ/4 birefringence member 131, the polarization beam splitter 133, and the second photoelectric converter 135. Description will be given now on the first object reflector 2 used in the above embodiment referring to FIGS. 23, 24 (A), and 24 (B), and on the second object reflector 3 referring to FIGS. 25, 26 (A) and 26 (B).

Figure 23:
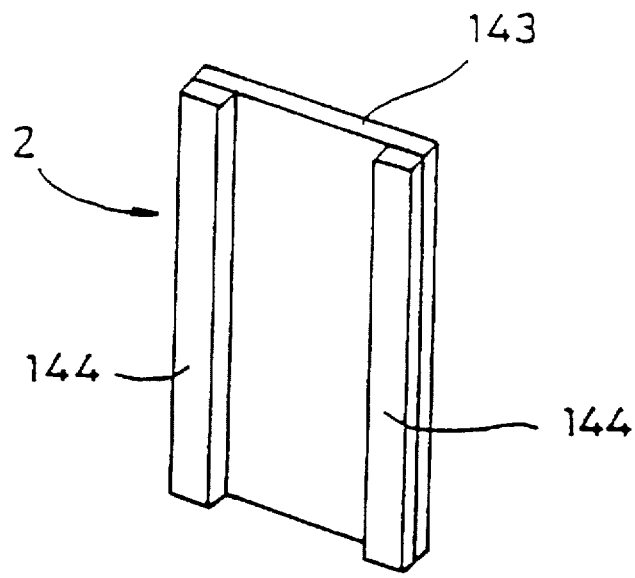
FIG. 23 is a perspective view of a still another example of the first object reflector.
Figure 24A:
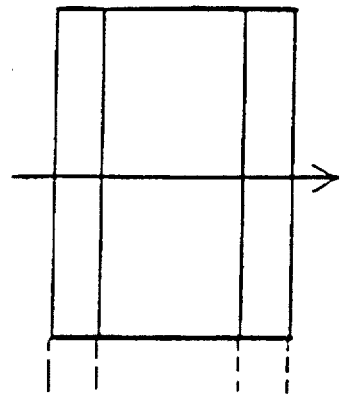
FIG. 24 (A) and FIG. 24 (B) each represents relationship between said still another example of the first object reflector and the reflection light receiving signal from the first object reflector.
Figure 24B:
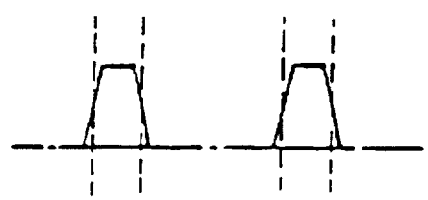
Figure 25:
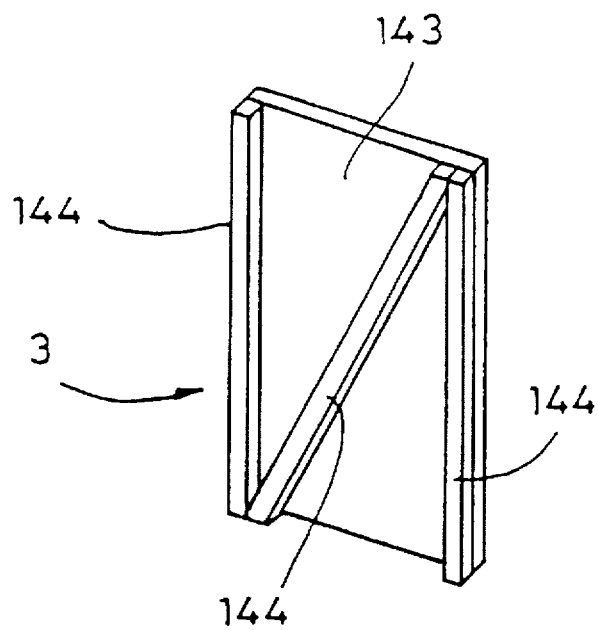
FIG. 25 is a perspective view of a still another example of the second object reflector.
Figure 26A:
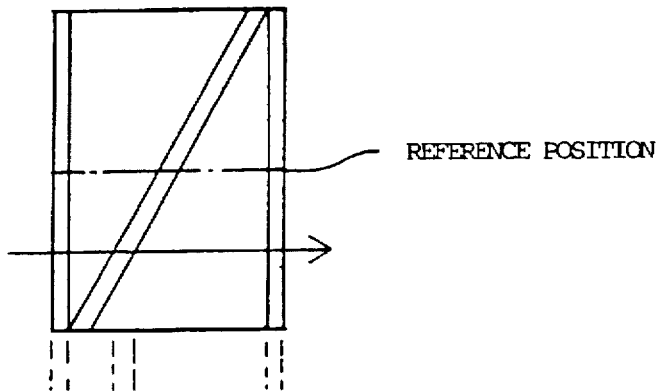
FIG. 26 (A) and FIG. 26 (B) each represents relationship between said still another example of the second object reflector and reflection light receiving signal from the second object reflector.
Figure 26B:
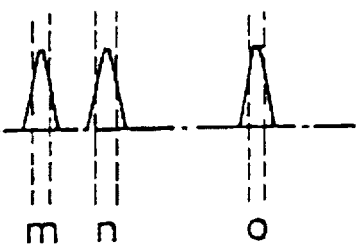

The first object reflector 2 has reflection layers 144 each in form of an oblong tablet on the two lateral edges of the base plate 143. The second object reflector 3 has reflection layers 144 each in form of an oblong tablet arranged on two lateral edges and along a diagonal line of the base plate 143 so that the reflection layers are arranged in N-shaped form. When the first object reflector 2 of FIG. 23 is scanned by the laser beam, the reflection laser beam reflected by the reflection layers 144 is irradiated via the pentagonal prism 114 and is deflected by the perforated mirror 128. Then, it enters the first photoelectric converter 134 via the condenser lens 130. In the output from the first photoelectric converter 134, two pulse-like signals are obtained as shown in FIG. 24 (B). Further, in case the second object reflector 3 of FIG. 25 is scanned by the laser beam, three pulse-like signals (m, n, o) are obtained as shown in FIG. 26 (B) in the output from the first photoelectric converter 134.

By calculating weighted center, i.e. the center of two pulses, of the signal obtained from the first object reflector 2 by the reflection light detection circuit 136, it is possible to detect the center relating to the scanning direction of the first object reflector 2. Further, of the output from the second object reflector 3, the pulse-like signal "n" is moved as the position of the scanning direction is moved in a direction perpendicular to the scanning direction. If it is deviated from the center of the second object reflector 3, the width obtained from a signal m-n is different from the width obtained from a signal n-o. When width of the signal m-n is equal to the width of the signal n-o, it is the center of the second object reflector 3. Therefore, by detecting that the central pulse-like signal "n" is positioned at the center between "m" and "o", it is detected that the scanning position of the laser beam is at the center, i.e. at the reference position, of the second object reflector 3. Because pattern of the output signal from the first photoelectric converter 134 is different between the first object reflector 2 and the second object reflector 3, it is possible to distinguish the first object reflector 2 from the second object reflector 3 in the reflection light detection circuit 136.

Figure 27:
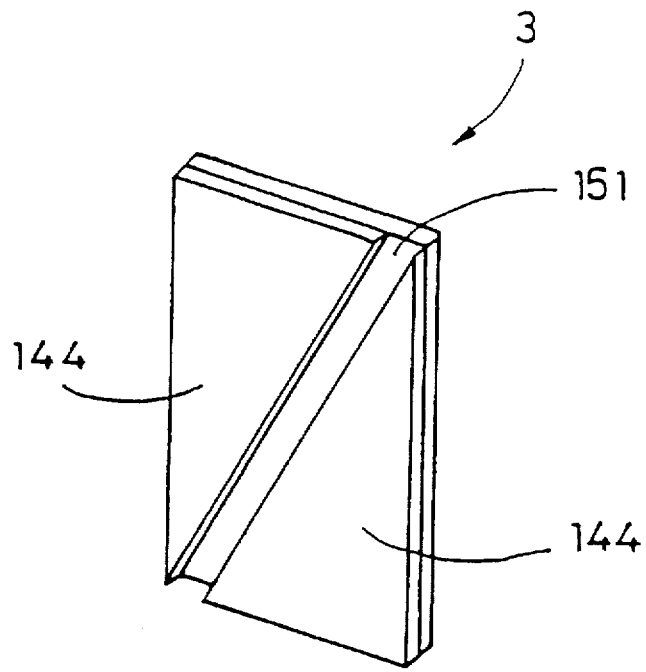
FIG. 27 is a perspective view of a yet still another example of the second object reflector.
Figure 28A:
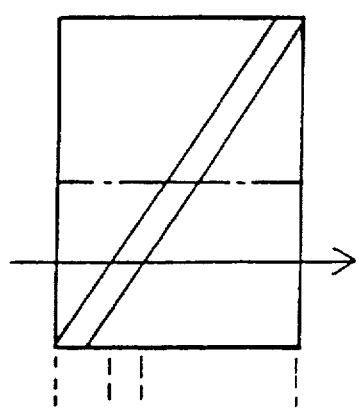
FIG. 28 (A) and FIG. 28 (B) each represents relationship between said yet still another example of the second object reflector and the reflection light receiving signal from the second object reflector.
Figure 28B:
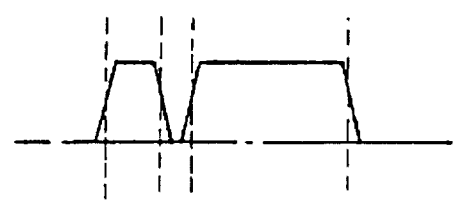

In the second object reflector 3 shown in FIG. 27, a non-reflection zone 151 is formed along the diagonal line. When the second object reflector 3 is scanned by the laser beam, two pulse-like signals are obtained as shown in FIG. 28 (B), and the two pulse-like signals have different widths depending upon the scanning position of the laser beam. When the widths of the two pulse-like signals are equal to each other, the laser beam scans the center of the second object reflector 3. By comparing the two pulse widths in the reflection light detection circuit 136, it is possible to detect the center, i.e. the reference position, of the second object reflector 3. Further, widths of two pulse-like signals from the first photoelectric converter 134 are different between the first object reflector 2 and the second object reflector 3. Accordingly, it is possible to identify the first object reflector 2 and the second object reflector 3 in the reflection light detection circuit 136.

Even in case the first object reflector 2 and the second object reflector 3 using no λ/4 birefringence member are used, the arrangement of the rotary irradiating system main unit 1 shown in FIG. 9 may be adopted. Specifically, modification may be made on a circuit or on a signal processing in such manner that the polarized reflection light beam returning to the main unit with the same direction of polarization as that of the polarized irradiation light beam emitted from the light emitter 115 enters the second photoelectric converter 135 and detects only the signal obtained. From the signal pattern obtained from the second photoelectric converter 135, the center of the first object reflector 2 or the second object reflector 3 is detected, or the first object reflector 2 is distinguished from the second object reflector 3.

Figure 29:
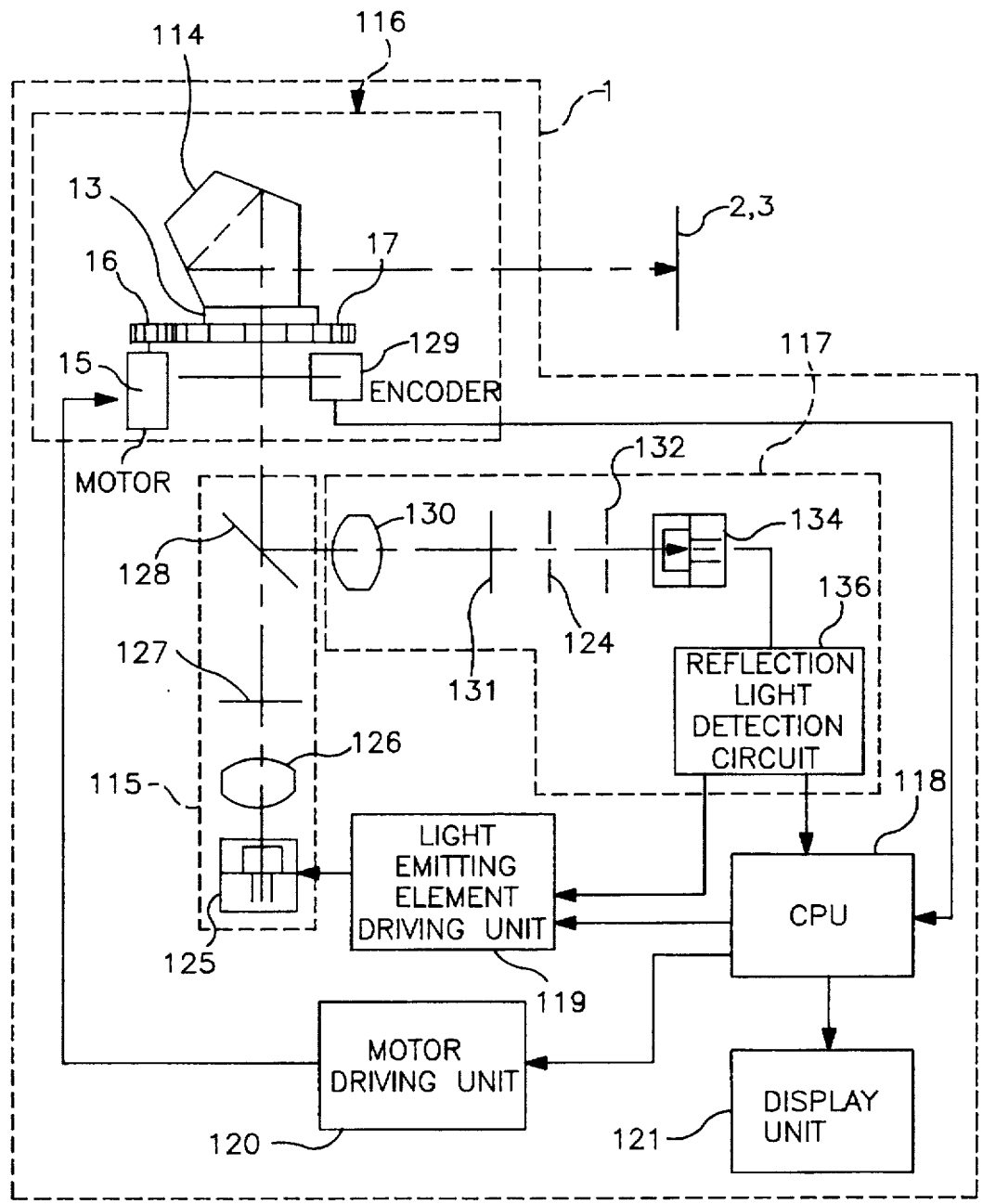
FIG. 29 is a control block diagram of a still another embodiment of present invention.

Further, the λ/4 birefringence member may be provided on all of the reflection surfaces of the first object reflector 2 and the second object reflector 3 shown in FIGS. 23 to 28. Referring to FIG. 29, description will be given on an optical arrangement and an electrical arrangement of the rotary irradiating system main unit 1 of the laser rotary irradiating system using the first object reflector 2 and the second object reflector 3, which have the λ/4 birefringence members on all of the reflection surfaces.

In this embodiment, the laser beam irradiated from the light emitter 115 is a circularly polarized light, and a polarizing member 124 is additionally provided between the λ/4 birefringence member 131 and the pinhole 132 on the optical axis from the perforated mirror 128 to the first photoelectric converter 134 in the arrangement shown in FIG. 9.

The linearly polarized laser beam emitted from the laser diode 125 passes through the collimator lens 126. After being collimated, the laser beam passes through the λ/4 birefringence member 127 and is turned to a circularly polarized light. It is irradiated from the rotary irradiating system main unit 1 as a circularly polarized light. Being reflected by the first object reflector 2 and the second object reflector 3, the laser beam passes through the λ/4 birefringence member. The reflection laser beam, with its rotating direction of the circularly polarized light changed, enters the rotary irradiating system main unit 1 and further enters the reflection light detection unit 117.

The reflection laser beam is converted to a linearly polarized light deviated by 180° from the light source by the λ/4 birefringence member 131. Also, the polarizing member 124 is designed in such manner that only the linearly polarized light deviated by 180° from the laser beam emitted from the light source is allowed to pass. Thus, a mere reflection light, i.e. a polarized light having the same direction as that of the light source, is not allowed to pass. When received at the first photoelectric converter 134, the subsequent operation is the same as in the system shown in FIG. 22, which does not use the λ/4 birefringence member. In this embodiment, an external disturbance light other than a circularly polarized light or an external disturbance light having a different direction of polarization is excluded, and this contributes to improvement of detection accuracy.

Regardless of whether the λ/4 birefringence member is present or not on the reflection surfaces of the first object reflector 2 and the second object reflector 3 as shown in FIGS. 23 to 28, the distance can be calculated from the relation with the scanning speed by measuring the time of the laser beam to go across when scanning the object reflectors 2 and 3 from the output signal of the first photoelectric converter 134. The irradiated laser beam can be focused on the object reflectors 2 or 3 based on the calculated distance. Further, in addition to the method based on the time measurement as described above, an angle between the ends of the first object reflector 2 or the second object reflector 3 can be obtained from the output signal of the first photoelectric converter 134 and the output of the encoder 129 when the object reflectors 2 and 3 are scanned. Because dimensions of the first object reflector 2 and the second object reflector 3 are already known, it is possible to calculate the distance between the rotary irradiating system main unit 1 and the object reflectors 2 or 3. Based on the calculated distance, the irradiated laser beam can be focused on the object reflectors 2 and 3.

It is needless to say that the present invention can be carried out in case the first object reflector 2 is identical with the second object reflector 3, e.g. in case there is only one object reflector. In this case, the position is detected by the initial operation, and the position of the main unit is determined. When it is determined, it is advanced to the next operation, and scanning is performed on the object reflector. When the object reflector is moved, it is followed while scanning. If the object reflector is moved beyond the scanning range, rotary scanning is performed. When it is detected, scanning is performed again. Naturally, different modes should be used when there are two reflectors or only one reflector, and the mode should be switched over.

INDUSTRIAL APPLICABILITY

As described above, it is possible according to the present invention to confirm the position of the formed reference plane and to improve reliability of the reference plane whenever setting-out operation is performed using a laser rotary irradiating system, or by adequately measuring the scanning position of laser beam on the second object reflector.

What is claimed is:

1. A laser rotary irradiating system, comprising a rotary irradiating system main unit and object reflectors including at least a first object reflector and a second object reflector, said rotary irradiating system main unit comprises a rotating unit for rotating and irradiating an irradiation light beam toward the object reflectors, detecting means for detecting a reflection light beam reflected from the object reflectors and entering to the rotary irradiating system main unit via said rotating unit, and a reflection light detection circuit for identifying the object reflectors from an output of said detecting means, wherein position and range of scanning by the laser beam are determined based on the results of said detection, and each of the reflection surfaces of said object reflectors is divided into at least two portions.

2. A laser rotary irradiating system, comprising a rotary irradiating system main unit and object reflectors including at least a first object reflector and a second object reflector, said rotary irradiating system main unit comprises a rotating unit for rotating and irradiating a polarized irradiation light beam toward the object reflectors, first detecting means for detecting a polarized reflection light beam from the object reflectors and entering the rotary irradiating system main unit via said rotating unit, second detecting means for detecting a polarized light beam different from said polarized reflection light beam from the object reflectors, and a reflection light detection circuit for identifying the object reflectors by comparing of an output of the first detecting means with an output of the second detecting means, wherein a position and a range of scanning by the laser beam are determined based on the results of said detection, each of reflection surfaces of said object reflectors is divided into at least two sectors, at least one thereof is a polarization maintaining reflection sector to reflect as a polarized reflection light beam, which maintains direction of polarization as that of the polarized irradiation light beam, and at least other one thereof is a polarization converting reflection sector to reflect as a polarized reflection light beam, which converts direction of polarization from that of the polarized irradiation light beam.

3. A laser rotary irradiating system according to claims 1 or 2, wherein a dividing mode of reflection surfaces is different between said first object reflector and said second object reflector.

4. A laser rotary irradiating system according to claims 1 or 2, wherein the irradiation light beam irradiated from said rotating unit is a circularly polarized light.

5. A laser rotary irradiating system according to claim 1, wherein each of said first object reflector and said second object reflector has two or more reflection sectors divided, the reflection sectors of said first object reflector are arranged at symmetrical positions, and shape of the reflection sectors of said second object reflector are gradually changed.

6. A laser rotary irradiating system according to claim 3, wherein said first object reflector is divided in such manner that there is no change in width of the polarization maintaining reflection sector and the polarization converting reflection sector, and the second object reflector is divided in such manner that one of width of the polarization maintaining reflection sector or the polarization converting reflection sector is gradually decreased, and the other of width is gradually increased.

7. A laser rotary irradiating system according to one of claim 2, wherein the reflection light detection circuit detects widths of the reflection sector and the polarization converting reflection sector depending upon light receiving time to receive the polarized reflection light beam.

8. A laser rotary irradiating system according to claim 1, wherein the reflection light detection circuit calculates time interval of two signals obtained by scanning the object reflector, and a distance between the rotary irradiating system main unit and the object reflector is calculated based on said time interval and on dimensions already known of the object reflector corresponding to said two signals.

9. A laser rotary irradiating system according to claim 2, wherein an encoder for detecting an angle of rotation of the rotating unit is provided, and the reflection light detection circuit detects widths of the reflection sector and the polarization converting reflection sector from the angle, at which each polarized reflection light beam is obtained, based on signals from said encoder and on signals from said first detecting means and said second detecting means.

10. A laser rotary irradiating system according to claim 1, wherein there is provided an encoder for detecting an angle of rotation of the rotating unit, the reflection light detection circuit obtains an angle of rotation between two signals by said encoder based on the two signals obtained by scanning the object reflector, and a distance between the rotary irradiating system main unit and the object reflector is calculated based on said angle of rotation and dimensions already known of the object reflector corresponding to said two signals.

11. A laser rotary irradiating system according to claims 1 or 2, wherein the reflection light detection circuit identifies the first object reflector and the second object reflector, performs a scanning-mode for reciprocal scanning on and around the first object reflector, and performs an alignment-mode for detecting the scanning position of the laser beam from condition of change of the reflection laser beam from the second object reflector.

12. A laser rotary irradiating system according to claim 1 or 2, wherein a laser beam irradiating optical system of said rotary irradiating system main unit has focusing means.

13. A laser rotary irradiating system according to claim 8, wherein the laser beam irradiating optical system of said rotary irradiating system main unit has focusing means, and the irradiation light beam is focused on the object reflector based on said calculated distance to the object reflector.

14. A laser rotary irradiating system according to claim 11, wherein said rotary irradiating system main unit comprises a display unit, and said display unit displays the scanning position of said second object reflector in the alignment-mode.

15. A laser rotary irradiating system according to claim 10, wherein the laser beam irradiating optical system of said rotary irradiating system main unit has focusing means, and the irradiation light beam is focused on the object reflector based on said caluclated distance to the object reflector.

* * * * *